(12) United States Patent
Nijland

(10) Patent No.: US 12,541,830 B2
(45) Date of Patent: Feb. 3, 2026

(54) DISPLAY-OPTIMIZED AMBIENT LIGHT HDR VIDEO ADAPATION

(71) Applicant: KONINKLIJKE PHILIPS N.V., Eindhoven (NL)

(72) Inventor: Rutger Nijland, Venlo (NL)

(73) Assignee: Koninklijke Philips N.V., Eindhoven (NL)

( * ) Notice: Subject to any disclaimer, the term of this patent is extended or adjusted under 35 U.S.C. 154(b) by 273 days.

(21) Appl. No.: 18/289,589

(22) PCT Filed: Apr. 29, 2022

(86) PCT No.: PCT/EP2022/061503
§ 371 (c)(1),
(2) Date: Nov. 6, 2023

(87) PCT Pub. No.: WO2022/233728
PCT Pub. Date: Nov. 10, 2022

(65) Prior Publication Data
US 2024/0273692 A1    Aug. 15, 2024

(30) Foreign Application Priority Data

May 7, 2021 (EP) .................................... 21172649

(51) Int. Cl.
*G06T 5/92* (2024.01)
*H04N 23/741* (2023.01)
(Continued)

(52) U.S. Cl.
CPC ............. *G06T 5/92* (2024.01); *H04N 23/741* (2023.01); *G01J 3/462* (2013.01);
(Continued)

(58) Field of Classification Search
None
See application file for complete search history.

(56) References Cited

U.S. PATENT DOCUMENTS

| 11,151,962 B2* | 10/2021 | Van De Kerkhof ... H04N 21/84 |
| 2009/0251448 A1* | 10/2009 | Kuwabara ............ H04N 9/3179 382/167 |

(Continued)

OTHER PUBLICATIONS

ITU-R WP 6C VIA SC 29 Secretariat:"Liaison Statement from ITU-R WP 6C", LI4. MPEG Meeting; Feb. 22, 2016-Feb. 26, 2016; San Diego; (Motion Picture Expert Group or SO/IEC JTC1/SC29/WG11),Feb. 12, 2016.

(Continued)

*Primary Examiner* — Haris Sabah

(57) ABSTRACT

To obtain in a pragmatic manner better watchable images for various potentially considerably different viewing environment light levels, the inventor proposes a method of processing an input image to obtain an output image, comprising: obtaining for the pixels of the input image starting lumas (Yn_CC), by applying an opto-electronic transfer function (OETF_psy) to input luminances (L_in) of the input image; obtaining a minimum luminance of a targeted display (mL_VD), the targeted display corresponding to an end-user display (210), which end-user display is to be supplied with the output image to display it; obtaining a minimum luminance of the end-user display (mL_De) in a viewing room, wherein the minimum luminance of the end-user display (mL_De) is dependent on an amount of illumination in the viewing room; calculating a difference (dif) by subtracting the luminance of the end-user display (mL_De) from the minimum luminance of a targeted display (mL_VD); converting the difference (dif) to a luma difference (Ydif) by applying the opto-electronic transfer function (OETF_psy) with the difference as input to the opto-electronic transfer function (OETF_psy), which yields the luma difference as output; mapping the starting lumas by applying a linear function which applies as additive constant the luma difference multiplied by −1.0, and uses the luma difference (Continued)

increased by the value 1.0 as multiplier to multiply by the starting lumas, which yields mapped lumas (Yim); converting the mapped lumas (Yim) by applying the inverse of the opto-electronic transfer function to obtain normalized intermediate luminances (Lim); subtracting a second minimum luminance of an end-user display (mL_De2) divided by a maximum luminance of the output image (PL_O) from the intermediate luminances (Ln_im), and scaling the subtraction by 1.0 minus the result of dividing the second minimum luminance of an end-user display (mL_De2) by the maximum luminance of the output image (PL_O), to obtain final normalized luminances (Ln_f); multiplying the final normalized luminances (Ln_f) by the maximum luminance of the output image (PL_O), to obtain output luminances; and outputting the output luminances in a color representation of pixels of the output image.

11 Claims, 9 Drawing Sheets

(51) Int. Cl.
*G01J 3/46* (2006.01)
*H04N 1/60* (2006.01)

(52) U.S. Cl.
CPC .............. *G06T 2207/20208* (2013.01); *G06T 2207/20224* (2013.01); *H04N 1/60* (2013.01)

(56) References Cited

U.S. PATENT DOCUMENTS

| | | | |
|---|---|---|---|
| 2018/0262735 A1* | 9/2018 | Nakajima | G06T 5/70 |
| 2019/0130542 A1* | 5/2019 | Tichelaar | G06T 5/90 |
| 2019/0304379 A1 | 10/2019 | Pltlarz et al. | |
| 2019/0311694 A1* | 10/2019 | Van Mourik | H04N 9/67 |
| 2021/0096023 A1 | 4/2021 | Yang et al. | |

OTHER PUBLICATIONS

International Search Report and Written Opinion from PCT/EP2022/061503 mailed Aug. 10, 2022.

* cited by examiner

DISPLAY-OPTIMIZED AMBIENT LIGHT HDR VIDEO ADAPATION

CROSS-REFERENCE TO PRIOR APPLICATIONS

This application is the U.S. National Phase application under 35 U.S.C. § 371 of International Application No. PCT/EP2022/061503, filed on Apr. 29, 2022, which claims the benefit of EP Patent Application No. EP 21172649.2, filed on May 7, 2021. These applications are hereby incorporated by reference herein.

FIELD OF THE INVENTION

The invention relates to methods and apparatuses for adapting the image pixel luminances of a High Dynamic Range video to yield a desired look for a situation of displaying the HDR video under a particular viewing site ambient light amount.

BACKGROUND OF THE INVENTION

A few years ago, novel techniques of high dynamic range (HDR) video coding were introduced, inter alia by applicant (see e.g. WO2017157977).

Coding of a video is generally concerned mostly, or only, with making or more precisely defining color codes (e.g. a luma and two chromas per pixel) to represent the images. This is something different than knowing how to optimally display a HDR image (e.g., the simplest methods merely employ a highly non-linear Opto-Electrical transfer function OETF to convert desired luminances into e.g. 10 bit luma codes, and vice versa one can convert those video pixel luma codes into to be displayed luminances, by using an inversely shaped Electro-optical transfer function EOTF, mapping the 10 bit electrical luma codes to the to be displayed optical pixel luminances, but more complex systems can deviate in several directions, in particular by disconnecting the coding of an image, from a particular use of a coded image).

The coding and handling of HDR video contrasts quite majorly with how legacy video technology was used, according to which all videos were encoded until recently, which is nowadays called Standard Dynamic Range (SDR) video coding (a.k.a. low dynamic range video coding; LDR). This SDR started out as PAL or NTSC in the analogue era, moving to Rec. 709-based coding e.g. MPEG2 compressed in the digital video era.

Though being a satisfactory technology for communicating moving pictures in the $20^{th}$ century, advances in display technology, beyond the physical limits of the electron beam of the $20^{th}$ century CRT, or the globally TL-backlit LCD, made it possible to show images with significantly brighter (and potentially also darker) pixels than on those legacy displays, which urged a need to be able to code, and create such HDR images.

In fact, starting with the much brighter and possibly also darker image objects being uncodeable with the SDR standard (8 bit Rec. 709), for various reasons, one first invented ways of being able to technically represent those increased luminance range colors, and therefrom one by one all the rules of video technology were revisited, and often had to be re-invented.

SDR's luma code definition, of Rec. 709, was able to encode (with 8, or 10 bit lumas) only about 1000:1 luminance dynamic range because of its approximately square root OETF function shape, luma: Y_code=power(2, N)*sqrt (L_norm), in which N is the number of bits of the luma channel, and L_norm is a normalized between 0 and 1 version of the physical luminances.

Furthermore, in the SDR era there was no absolute to be displayed luminance defined, so one in fact mapped the maximum relative luminance L_norm_max=100%, or 1, to the maximum normalized luma code, Yn=1, corresponding to e.g. Y_code_max=255, via the square root OETF. This has several technical differences compared to making absolute HDR images, i.e. in which an image pixel coded to be displayed as 200 nit, is ideally (i.e. when possible) to be displayed as 200 nit, on all displays, and not as a quite different displayed luminance. In the relative paradigm, the 200 nit coded pixel luminance may be displayed at 300 nit on a brighter display, i.e. a display with a brighter maximum displayable luminance PL_D (a.k.a. display maximum luminance), and e.g. 100 nit on a lesser capability display. Note that also absolute encodings can work on normalized luminance representations, or normalized 3D color gamuts, but then 1.0 means e.g. uniquely 1000 nit.

At the display such a relative image got displayed somewhat heuristically, normally by mapping the brightest luminance of the video to the brightest displayable pixel luminance (which happened automatically without involving further luminance mapping, via the electrical driving the display panel by the max. luma Y_code_max), so if you bought a 200 nit PL_D display your white looked 2× brighter than on a 100 nit PL_D display, but given such factors like eye adaptation that was considered not to matter too much, except for giving a brighter, better watchable and somewhat more beautiful version of the same SDR video images.

Conventionally if one nowadays (in the absolute framework) speaks about a SDR video IMAGE, it typically has a video peak luminance of PL_V=100 nit (e.g. agreed per standard), so in this application we consider the maximum luminance of an SDR image (or SDR grading) to be exactly that, or generalized around that value.

Grading in this application is intended to mean either the activity or the resultant image in which pixels have been given a luminance as desired, e.g. by a human color grader, or an automaton. If one looks at an image, e.g. designs an image, there will be several image objects, and one may ideally want to give the pixels of those objects a luminance spread around an average luminance which is optimal for that object, given also the totality of the image, and the scene. E.g., if one has an image capability available so that the brightest codeable pixel of that image is 1000 nit (the image or video maximum luminance PL_V), one grader may elect to give the pixels of an explosion luminance values between 800 and 1000 nits, to make the explosion appear quite punchy, whereas another movie maker may elect an explosion no brighter than 500 nit, to e.g. not deter too much from the rest of the image at that moment in time (and of course technology should be able to handle both situations).

The maximum luminance of a HDR image or video may vary considerably, and is typically co-communicated with the image data as a metadatum about the HDR video or image (typical values may be e.g. 1000 nit, or 4000 nit, or 10,000 nit, non-limited; typically one would say to have a HDR image when PL_V is at least 600 nit). If the video creator elects to define his images as PL_V=4000 nit, he can of course elect to create brighter explosions, although relatively they would not reach to the 100% level of PL_V, but e.g. only up to 50% for such a high PL_V definition of the scene.

HDR displays may have a maximum capability, i.e. a highest displayable pixel luminance of (starting for the lower end HDR displays) e.g. 600 nit, or 1000 nit, or a number N times 1000 nits. That display maximum—or peak—luminance PL_D is something else than the video maximum luminance PL_V, and those two should not be confused. A video creator cannot typically make an optimal video for each possible end-user display (i.e. in which the capability of the end-user display is used optimally by the video, with the maximum luminance of the video never exceeding the maximum luminance of the display (ideally), but also not being lower, i.e. there should at least be some pixels in some of the video images which have a pixel luminance L_p=PL_V, which for continuous optimization to any particular display would also involve PL_V=PL_D).

The creator will make some of his own decisions (e.g. what kind of content is he capturing, and in which manner), and typically make a video with a PL_V so high that he can at least serve the highest PL_D displays of his intended audience today, and possibly also in the future, when higher PL_D displays may have emerged.

A secondary question then emerges, how to best display an image with a peak luminance PL_V on a display with a (oftentimes much) lower display peak luminance PL_D, which is called display adaptation. Even in the future, there will still be displays that require a lower dynamic range image than the e.g. 2000 nit PL_V image which was created, and is received via a communication medium. In theory a display can always re-grade i.e. map the luminances of the image pixels so that they become displayable by its own internal heuristics, but if the video creator takes good care in determining the pixel luminances, it may be beneficial that he can also indicate how his image should be display adapted to lower PL_D values, and ideally the display follows these technical desiderata to a large degree.

Regarding the darkest displayable pixel luminance BL_D, the situation is more complicated. Some of it may be a fixed physical property of the display, like e.g. LCD cell leak light, but, even with the best displays, what the viewer can ultimately discern as different darkest blacks, also depends on the illumination of the viewing room, which is not a well-defined value. This illumination can be characterized as e.g. an average illuminance level in lux, but for video displaying purposes more elegantly as a minimum pixel luminance. This typically also involves the human eye, in a more strong manner than the appearance of bright or middle luminances, because if the human eye is looking at a lot of pixels of high brightness, the darker pixels, and especially their absolute luminance, may become less relevant. But one can assume the eye not to be the limiting factor, e.g. when watching a largely dark scene image but still masked by surround light on the front of the display screen. If one assumes that a human can see 2% just noticeable difference, there is some darkest driving level (or luma) b, above which one can still see the next dark luma level (i.e. X % higher in displayed luminance, e.g. displaying 2% more luminance level).

In the LDR era one didn't care too much about the darkest pixels at all. One cared mostly about the average luminance, approximately ¼ of the maximum PL_V=100 nit. If the image was exposed around this value, everything in the scene looked nicely bright and colorful, except for the clipping of bright parts of the scene above the 100% maximum. For the darkest parts of the scene, in case they were sufficiently important, one created the captured images with a sufficient amount of base lighting in the recording studio or shooting environment. If some of the scene was not seen well, e.g. because it got drowned into the code Y=0, that was considered normal.

Ergo, if nothing is specified further, one may assume that the blackest black is zero, or something like 0.1 or 0.01 nit in practice. In such a situation the technologist cares more about the above-average brighter pixels in the HDR image, as coded, and/or displayed.

Regarding the coding, the difference between HDR and SDR is not only a physical one (more different pixel luminances, to be displayed on larger dynamic range capability displays), but also a technical one involving a different luma code allocation function (for which one uses the OETF; or in absolute methods the inverse of the EOTF), and potentially also further technical HDR concepts like e.g. additional dynamically (per image or set of temporally successive images) changing metadata, which specifies how to re-grade the various image object pixel luminances to obtain an image of a secondary dynamic range different from a starting image dynamic range (the two luminance ranges typically ending at a peak luminance which differs at least 1.5×), etc.

A simple HDR codec was introduced to the market, the HDR10 codec, which is e.g. used to create the recently appearing black jewelbox HDR blu-rays. This HDR10 video codec uses as OETF (inverse EOTF) a more logarithmically shaped function than the square root, namely the so-called Perceptual Quantizer (PQ) function which is standardized in SMPTE 2084. Instead of being limited to 1000:1 like the Rec. 709 OETF, this PQ OETF allows defining lumas for many more (ideally to be displayed) luminances, namely between 1/10,000 nit and 10,000 nit, sufficient for practical HDR video production.

Note that the reader should not simplistically confuse HDR with a large amount of bits in the luma code words. That may be true for linear systems like the amount of bits of an analog-digital convertor, wherein indeed the amount of bits follows as the logarithm with base 2 of the dynamic range. However, since code allocation functions can have a quite non-linear shape, in theory however one desires, one can define HDR images with only 10 bit lumas (and even 8 bit per color component HDR images), which led to the advantage of reusability of already deployed systems (e.g. ICs may have a certain bit-depth, or video cables, etc.).

After the calculation of the lumas, one has a 10 bit plane of pixel lumas Y_code, to which two chrominance components Cb and Cr per pixel are added, as chrominance pixel planes. This image can be classically treated further down the line "as if" it was an SDR image mathematically, e.g. MPEG-HEVC compressed, etc. The compressor doesn't really need to care about the pixel colors or luminances.

But the receiving apparatus e.g. display (or in fact its decoder) typically needs to do the correct color interpretation of the {Y,Cb,Cr} pixel colors, to display a correctly looking image, and not an image which has e.g. bleached colors.

This is usually handled by co-communicating further image definition metadata together with the three pixelated color component planes, which defines the image coding, such as an indication which EOTF is used, for which we shall assume without limitation that the PQ EOTF (or OETF) was used, and a value of PL_V, etc.

More sophisticated codecs may include further image definition metadata, e.g. handling metadata, e.g. a function specifying how to map normalized version of luminances of a first image up to PL_V=1000 nit, to normalized luminances of a secondary reference image, e.g. a PL_V=100 nit SDR reference image (as we elucidate in more detail with FIG. 2).

For the convenience of getting readers which are less knowledgeable about HDR up to speed, we quickly elucidate some interesting aspects in FIG. 1, which shows a couple of archetypical illustrative examples of the many possible HDR scenes a HDR system of the future (e.g. connected to a 1000 nit PL_D display) may need to be able to correctly handle. Actual technical processing of the pixel colors can happen in various color space definitions in various manners, but the desideratum of a re-grading can be shown as an absolute luminance mapping, between luminance axes spanning different dynamic ranges.

E.g. ImSCN1 is a sunny outdoors image from a western movie, which has mostly bright areas. A first thing one should not misunderstand is that the pixel luminances in any image are typically not the luminances one can actually measure in the real world.

Even if there was no further human involvement in the creation of the output HDR image (which can function as a starter image, which we shall call the master HDR grading or image), no matter how simple by tweaking one parameter, the camera because of its iris at least always measures relative luminances in the image sensor. So there is always some step involved into where at least a brightest image pixel ends up in the available coding luminance range of the master HDR image.

E.g., one may measure a specular reflection of the sun on the sheriff's star badge to be above 100,000 nit in the real world, but that is neither possible to display on the typical near-future display, nor pleasant for a viewer watching the image in a movie, e.g. in a dimly lit room in the evening. Instead, the video creator may decide that 5000 nit is bright enough for the pixels of the badge, so if this is to be the brightest pixel in the movie, the video creator may decide to make a PL_V=5000 nit video. Although, being a relative pixel luminance measuring device only for a RAW version of the master HDR grading, a camera should also have a sufficiently high native dynamic range (full pixel well over noise floor) to make good images. The pixels of the graded 5000 nit image are typically derived in a non-linear manner from the camera captured RAW image, wherein e.g. the color grader will take into account such aspects as typical viewing situation, which will not be the same as when standing in the actual shooting location, i.e. the hot desert. The best (highest PL_V) image one elects to make for this scene ImSCN1, i.e. in this example the 5000 nit image is the master HDR grading. This is the minimally required HDR data to be created and communicated, but not in all codecs the only data communicated, nor in some codecs even the image that gets communicated at all.

Having available such an encodeable high luminance range DR_1, e.g. between 0.001 nit and 5000 nit, would allow the content maker to offer to the viewer a better experience of bright exteriors, but also dimmer night scenes (when well graded throughout the movie), of course, provided that the viewer will also have a corresponding high end PL_D=5000 nit display. A good HDR movie balances the luminance of various image objects not only in one image, but also over time in the story of the movie, or in general created video material (e.g. a well-designed HDR soccer program).

On the leftmost vertical axis of FIG. 1 are shown some (average) object luminances as one would like to see them in the 5000 nit PL_V master HDR grading, intended ideally for a 5000 nit PL_D display. E.g., in a movie, one may want to show a bright sunlit cowboy having pixel luminances around 500 nit (i.e. 10× brighter than in LDR typically, although another creator may desire somewhat less HDR punch, e.g. 300 nit), which would constitute according to the creator the best manner to display this western image, giving the best possible look to the end consumer.

The need for a higher dynamic range of luminances is more easily understood by thinking about an image which in the same image has quite dark regions, such as the shadowy corners of the cave image ImSCN3, but also relatively large areas of very bright pixels, like the sunlit outside world seen through an entrance of the cave. That creates a different visual experience than e.g. the nighttime image of ImSCN2, in which only the street lights contain high luminance pixel regions.

Now a problem is that one needs to be able to define a PL_V_SDR=100 nit SDR image optimally corresponding to the master HDR image, because at the moment still many consumers have an LDR display, and even in the future there will be good reasons to make two gradings of a movie, instead of the archetypical sole HDR image per se coding. This is a technical desideratum which stands separate from the technical elections regarding the coding per se, which is e.g. evidenced that if one knows how to (invertibly) create one of the master HDR image and this secondary image from the other one, one can elect to code and communicate either one of the pair (effectively communicating two images for the price of one, i.e. communicating only one image a pixel color component planes per video time instant).

In such a reduced dynamic range image, one can of course not define 5000 nit pixel luminance objects like a really bright sun. The minimum pixel luminance or deepest black may also be as high as 0.1 nit, rather than a more preferable 0.001 nit.

So somehow one should be able to make this corresponding SDR image with a reduced luminance dynamic range DR_2.

This could be done by some automatic algorithm in the receiving-side display, e.g. one could use a fixed luminance mapping function, or may be one conditioned by the simple metadata like the PL_V_HDR value, and potentially one or more other luminance values.

However, in general more complex luminance mapping algorithms can be used, but for this application we assume without loss of generality that the mapping is defined by some global luminance mapping function F_L (e.g. one function per image), which defines for at least one image how all possibly occuring luminances in the first image (i.e. e.g. 0.0001-5000) are to be mapped to corresponding luminances of the second, output image (e.g. 0.1 to 100 nit for an SDR output image). The normalized function can be obtained by dividing the luminances along both axis by their respective maximum. Global in this context means that the same function is used for all pixels of the image irrespective of further conditions like e.g. their position in the image (more generic algorithms using e.g. several functions for pixels classifiable according to some criterium).

Ideally, how all luminances should re-distribute along the available range of the secondary image, the SDR image, should be determined by the video creator, since he knows best how to sub-optimize for a reduced dynamic range so that, given limitations, the SDR image still looks at least as good as feasible like the intended master HDR image. The reader can understand that actually defining (positioning) such object luminances corresponds to defining a shape of the luminance mapping function F_L, the details of which are beyond this present application.

Ideally the shape of the function should also change per different scene, i.e. the cave scene versus the sunny western scene a little later in the movie, or in general per temporal image. This is called dynamic metadata (F_L(t), with t indicating image time instant).

Now ideally the content creator would make an optimal image for each situation, i.e. each potentially served end-user display, e.g. a display with PL_D_MDR=800 nit requiring a corresponding PL_V_MDR=800 nit image, but that is typically much too much effort for the content creator, even in the most expensive offline video creations.

It has however been demonstrated previously by applicant that it suffices to make (only) two different dynamic range reference gradings of the scene (typically on extreme ends, e.g. 5000 nit being the highest necessary PL_V, and 100 nit typically sufficing as the lowest needed PL_V), since one can then derive all the other gradings from those two reference gradings (HDR and SDR) automatically, via some (typically fixed, e.g. standardized) display adaptation algorithm, e.g. applied in the end-user display which receives information of the two gradings. In general the calculations can be done in any video receiver, e.g. a settopbox, TV, computer, cinema equipment or the like. The communication channel for the HDR images can also be any communication technology, e.g. terrestrial or cable broadcasting, physical media like a blu-ray disk, the internet, communication channels to portable devices, professional inter-site video communication, etc.

This display adaptation may typically also apply a luminance mapping function, e.g. to the pixel luminances of the master HDR image. But the display adaptation algorithm needs to determine a different luminance mapping function than the F_L_5000 to 100 (which is the reference luminanance mapping function connecting the luminances of the two reference gradings), namely display adapted luminance mapping function FL_DA, which is not necessarily trivially related to the original mapping function between the two reference gradings, F_L (there can be several variants of display adaptation algorithms). A luminance mapping function between master luminances defined on a 5000 nit PL_V dynamic range, and a 800 nit medium dynamic range will in this text be written as F_L_5000 to 800.

We have shown the display adaptation symbolically (for one of the average object pixel luminances only) by an arrow which doesn't map to where one would "naïvely" expect the F_L_5000 to 100 function to cross the 800 nit MDR image luminance range, but e.g. somewhat higher (i.e. in such an image the cowboy must be slightly brighter, at least according to the elected display adaptation algorithm). So some more complex display adaptation algorithms may place the cowboy at the indicated higher position, but some customers may be satisfied with the simpler position where the connection between the 500 nit HDR cowboy and the 18 nit SDR cowboy crosses the 800 nit PL_V luminance range.

Typically the display adaptation algorithm calculates the shape of the display adapted luminance mapping function FL_DA based on the shape of the original luminance mapping function F_L (or reference luminance mapping function a.k.a. reference re-grading function).

This FIG. 1—based elucidating constituting the technical desiderata of any HDR video coding and/or handling system, in FIG. 2 we illustrate some exemplary technical systems and their components to realize the desiderata (non-limiting), as according to a codec approach of the present applicant. It should be understood by the skilled reader that these components can be embodied in various devices etc. The skilled person should understand that this example merely is presented as a pars pro toto for various HDR codec frameworks, to have a background understanding of some principles of operation, and it is not intended to particularly limit any of the embodiments of the innovative contribution presented below.

Although possible, technical communication of two actual different images per time instant (the HDR and SDR grading being each communicated as their respective three color planes) is expensive inter alia regarding the amount of data needed.

It is also not necessary, since if one knows that all corresponding secondary image pixel luminances can be calculated based on the luminance in the primary image and the function F_L, one can decide to communicate only the primary image and the function F_L per time instant as metadata (and one can elect to communicate either the master HDR or the SDR image as representative for the both). As the reciever knows its—typically fixed—display adaptation algorithm, it can based on this data determine the FL_DA function at its end (there may be further metadata communicated controlling or guiding the display adaptation, but that is not currently deployed).

There can be two modes of communicating a sole image per time instant and the function F_L.

In the first, backwards-compatible mode, one communicates the SDR image ("SDR communication mode"). That SDR image can be directly (without needing further luminance mapping) displayed on legacy SDR displays, but HDR displays need to apply the F_L or FL_DA function to obtain a HDR image from the SDR image (or its inverse, depending on which variant of the function is communicated, the up-grading or the down-grading variant). The interested reader can find all details of an exemplary first mode approach of the present applicant standardized in:

ETSI TS 103 433-1 V1.2.1 (2017-08): High-Performance Single Layer High Dynamic Range System for use in Consumer Electronics devices; Part 1: Directly Standard Dynamic Range (SDR) Compatible HDR System (SL-HDR1).

Another mode communicates the master HDR image itself ("HDR communication mode"), i.e. e.g. the 5000 nit image, and the function F_L which allows calculating the 100 nit SDR image from it (or any other lower dynamic range image, via the display adaptation). The master HDR communicated image itself can be encoded e.g. by using the PQ EOTF.

FIG. 2 also shows a total video communication system. At the transmission side, it begins with a source of images 201. Depending on whether one has offline created video, e.g. from an internet-delivery company, or real-life broadcast, this may be anything ranging from a hard disk to a cable output from e.g. a television studio, etc.

This yields the master HDR video (MAST_HDR) e.g. color graded by the human color grader, or a shaded version of a camera capturing, or by means of an automatic luminance re-distribution algorithm, etc.

In addition to grading a master HDR image, a set of often reversible color transformation functions F_ct is defined. Without intending to lose generalization, we assume this to comprise at least one luminance mapping function F_L (however, there may be further functions and data, e.g. specifying how the saturation of pixels should change from the HDR to the SDR grading).

This luminance mapping function defines as said above the mapping between the HDR and SDR reference grading (the latter in FIG. 2 being the SDR image Im_SDR to be communicated to receivers; data-compressed via e.g. an MPEG or other video compression algorithm or not).

One should not confuse any color mappings of color transformer 220 with anything that was applied to the raw camera feed to obtain the master HDR video, which is here already assumed to be input, since this color transformation is for obtaining the image to be communicated, and simultaneously the re-grading desiderata, as technically formulated in the luminance mapping function F_L.

For an exemplary SDR-communicating type (i.e. SDR communication mode), the master HDR image is input to color transformer 202 which is configured to apply the F_L luminance mapping to the luminances of the master HDR image (MAST_HDR), to obtain all corresponding luminances written into output image Im_SDR. Let's assume for elucidation the shape of this function is tweaked per shot of images of a similar scene of a movie by a human color grader, by using color grading software. The applied functions F_ct (i.e. at least F_L) are written in (dynamic, handling) metadata to be co-communicated with the images, in the example MPEG Supplemental Enhancement Information data SEI(F_ct), or a similar metadata mechanism in other standardized or unstandardized communication methods.

Having correctly re-defined the to be communicated HDR images as corresponding SDR images, Im_SDR, those images are often (at least for e.g. broadcasting to end users) compressed using existing video compression techniques (e.g. MPEG HEVC or VVC, or AV1, and the like). This is performed in video compressor 203, which forms part of video encoder 221 (which in turn may be comprised in various forms of video creation apparatuses or systems).

The compressed image Im_COD is transmitted to at least one receiver over some image communication medium 205 (e.g. a satellite or cable or internet transmission, e.g. according to ATSC 3.0, or DVB, etc.; but the HDR video signal may also be communicated e.g. over a cable between two video handling apparatuses).

Typically before communication some further transformation may be done by transmission formatter 204, which may apply depending on the system such techniques as e.g. packetization, modulation, transmission protocol control, etc. This will typically apply integrated circuits.

At any receiving site, a corresponding video signal unformatter 206 applies the necessary unformatting methods to re-obtain the compressed video as a set of e.g. compressed HEVC images (i.e. HEVC image data), e.g. demodulation etc.

Video decompressor 207 does the e.g. HEVC decompression, to obtain a stream of pixelated uncompressed images Im_USDR, which in the present example are SDR images, but in the other mode would be HDR images. The video decompressor will also unpack the necessary luminance mapping function F_L from the e.g. SEI messages, or in general color transformation functions F_ct.

The images and functions are input to a (decoder) color transformer 208 which is arranged to transform the SDR image to an image of any non-SDR dynamic range (i.e. of PL_V higher than 100 nit, and typically at least a few times higher, e.g. 5×).

E.g. a 5000 nit reconstructed HDR image Im_RHDR may be reconstructed as close approximation of the master HDR image (MAST_HDR) by applying the inverse color transformations IF_ct of the color transformations F_ct used at the encoding side to make the Im_LDR from the MAST_HDR. This image can then be sent e.g. to a display 210 for further display adaptation, but the making of a display adapted image Im_DA_MDR can also happen in one go, during the decoding, by using in the color transformer the FL_DA function (determined in an offline loop, e.g. in firmware) instead of the F_L function. So the color transformer may also comprise a display adaptation unit 209, to derive the FL_DA function.

The optimized e.g. 800 nit display adapted image Im_DA_MDR may be sent e.g. to a display 210 if the video decoder 220 is comprised e.g. in a settopbox or computer etc., or it may be sent to a display panel in case the decoder resides in e.g. a mobile phone, or it may be communicated to a movie theatre projector if the decoder resides in e.g. some internet-connected server, etc.

FIG. 3 shows a useful variant of internal processing of a color transformer 300 of a HDR decoder (or encoder, which may largely have the same topology typically, but using inverse functions, but typically not comprising the display adaptation), i.e. corresponding to FIG. 2, 208.

The luminance of a pixel, in this example an SDR image pixel, is inputted as a corresponding luma Y'SDR. The chrominance a.k.a. chroma components Cb and Cr are inputted into the lower processing path of color transformer 300.

The lumas Y'SDR are mapped to needed output luminances L'_HDR—e.g. master HDR reconstruction luminances, or some other HDR image luminances—by luminance mapping circuit 310. It applies the suitable function, e.g. the display adapted luminance mapping function FL_DA(t) for a particular image and maximum display luminance PL_D, as obtained from the display adaptation function calculator 350 which uses as input the metadata-co-communicated reference luminance mapping function F_L(t). The display adaptation function calculator 350 may also determine a suitable function for processing the chrominances. For the moment we will just assume that a set of multiplication factors mC[Y] for each possible input image pixel luma Y is stored in e.g. a color LUT 301. The exact nature of chromatic processing may vary. E.g., one may want to keep pixel saturation constant, by first normalizing the chrominances by the input lumas (corresponding hyperbolic curve in the color LUT), and then correcting for the output lumas, but any differential saturation processing may be used also. The hue will typically be maintained because both chrominances are multiplied by the same multiplier. When indexing the color LUT 301 with the luma value of the currently being color transformed (luminance mapped) pixel, Y, the needed multiplicative factor mC results as LUT output. This multiplicative factor mC is used by multiplier 302, to multiply it by the two chrominance values of the present pixel, i.e. to yield color transformed output chominances $$Cbo = mC * Cb,$$

$$Cro = mC * Cr$$

Via a fixed color matrixing processor 303, applying standard colorimetry calculations, the chrominances can be converted into brightness-lacking normalized non-linear R'G'B' coordinates R'/L', G'/L' and B'/L'.

The R'G'B' coordinates giving the appropriate luminance for the output image are obtained by multiplier 311, which calculates:

$$R'\_HDR = (R'/L') * L'\_HDR,$$

$$G'\_HDR = (G'/L') * L'\_HDR,$$

$$B'\_HDR = (B'/L') * L'\_HDR,$$

which can be summarized in the color triplet R'G'B'_HDR.

Lastly, there may be a further mapping to a format needed for a display, by display mapping circuit 320. This yields display driving colors D_C, which not only may be formulated in a colorimetry desired by a display (e.g. even HLG OEFT format), but also this display mapping circuit 320 may in some variants be arranged to do some particular color processing for the display, i.e. it may e.g. further re-map some of the pixel luminances.

Some examples elucidating some suitable display adaptation algorithms to derive a corresponding FL_DA function for any possible F_L function that the creation side grader may have determined, are taught in WO2016/091406 or ETSI TS 103 433-2 V1.1.1 (2018-01).

Those algorithms however do not take much care about the minimum displayable black on the end-user's display.

In fact one could say they pretend that the minimum luminance BL_D is small enough that it can be said to be zero. Therefore the display adaptation takes care mostly of the differences in maximum luminance PL_D of the various displays, compared to the maximum luminance of the video PL_V.

As one can see in the $18^{th}$ drawing of prior application WO2016/091406, any input function (in the elucidation example a simple function formed from two linear segments) is scaled towards the diagonal based on a metric positioned along a 135 degree angle starting from a horizontal axis of input luminances in a plot of typically normalized to 1.0 input and output luminances. It should be understood that this is just an example of a display adaptation of a total class of display adaptation algorithms, which is not mentioned in a manner intending to limit the applicability of our novel display adaptation concepts, e.g. in particular the angle of the metric direction can have other values.

But this metric, and its action on the re-shaped F_L function, i.e. the determined FL_DA function, depends only on the maximum luminance PL_V, and PL_D for the display to be served with optimally re-graded medium dynamic range images. E.g., the 5000 nit position would correspond to the zero metric point located on the diagonal (for any location lying along the diagonal corresponding to a possible pixel luminance in the input image) and the 100 nit position (marked PBE) would be a point of the original F_L function.

The display adaptation, as a useful variant of the method, is summarized in FIG. 4, by showing its action on a plot of possible normalized input luminances Ln_in, versus normalized output luminances Ln_out (these will be converted to actual luminances by multiplication by the maximum luminance of the display associated with the normalized luminances, i.e. a PL_V value).

E.g. the video creator has designed a luminance mapping strategy between the two reference gradings as explained with FIG. 1. Ergo, for any possible normalized luminance of a pixel in the input image, Ln_in, say e.g. the master HDR image, this normalized input luminance must be mapped to a normalized output luminance Ln_out, of the second reference grading being the output image. This re-grading of all luminances corresponds to some function F_L, which can have many different shapes as determined by the human grader or grading automaton, and the shape of this function is co-communicated as dynamic metadata.

The question is now, what shape should a derived secondary version of the F_L function have, in this simple display adaptation protocol, to map to an MDR image (instead of to a reference SDR image) for a medium dynamic range display (assume a mapping again starting from as input image the HDR reference grading image). E.g., on a metric, one can calculate that a e.g. 800 nit display should have 50% of the grading effect, the full 100% being the re-grading of the master HDR image to the 100 nit PL_V SDR image. In general, one can via a metric determine any point between no re-grading and full re-grading to the second reference image, for any possible normalized input luminance of a pixel (Ln_in_pix), which is denoted as display-adapted luminance L_P_n, the location of which depends of course on the input normalized luminance, but also a value of the maximum luminance associated with the output image (PL_V_out). The skilled person understand that whereas one can represent the function in a normalized luminance representation, one can equivalently represent it in any normalized luma representation, defined according to any OETF.

We can determine the corresponding display adapted luminance mapping FL_DA as follows (see FIG. 4a). Take any one of all input luminances, e.g. Ln_in_pix. This corresponds to a starting position on the diagonal having equal angles to the input and output axis of normalized luminances (shown as the square). Place a scaled version (scaled metric SM) of the metric at each point on the diagonal, so that it lies orthogonal to the diagonal (or 135 degrees from the input axis counter-clockwise), starts at the diagonal, and ends— with its 100% level—at a point on the F_L curve, i.e. at the intersection of the F_L curve with the orthogonal scaled metric SM (shown by the pentagon). Place a point at the (in the example, for this PL_D value of a display for which an image must be calculated) 50% level of the metric, i.e. halfway [note that in this case the PL_V value of the output image will be set equal to the PL_D value of the display which needs to be supplied with display-optimized images]. By doing this for all points on the diagonal, corresponding to all Ln_in values, one obtains the FL_DA curve, and it is similarly shaped as the original, i.e. does the same re-grading, but maximum-luminance-re-scaled/adjusted. This function is now ready to apply for calculating the needed corresponding optimally re-graded/display adapted 800 nit PL_V pixel luminances given any input HDR luminance value of Ln_in. This function FL_DA will be applied by luminance mapping circuit 310.

In general the properties of this display adaptation are as follows (and not intended as specifically more limited). The orientation of the metric may be pre-fixed as technically desired. FIG. 4b shows another scaled metric, namely a vertically oriented scaled metric SMV (i.e. orthogonal to the axis of the normalized input luminances Ln_in). Again, the 0% and 100% (or 1.0) correspond to no re-grading (i.e. an identity transformation to the input image luminances) respectively re-grading to the second one of the two reference grading images (in this example related by a differently shaped luminance mapping function F_L2).

The positions of the measurement points on the metric, i.e. where the 10%, 20% etc. value lies, may also be varied technically, but will typically be non-linear.

It will be pre-designed in the technology, e.g. a television display. E.g. a function as described in WO2015007505 may be used. One can also design a logarithmic function, so that some a*(log(PL_V)+b) equals 1.0 for the PL_V_HDR values (e.g. 5000 nit) and the 0.0 point corresponds to the 100 nit PL_V_SDR reference level, or vice versa. The position for any PL_V_MDR for which image luminances need to be calculated, then follows from the designed mathematics of the metric.

The action of such a metric is summarized with FIG. 5.

Display adaptation circuit 510, e.g. in a television, or settopbox, etc., may contain a configuration processor 511. It sets the values for processing of an image, before the running pixel colors of that image come in to be processed. E.g., the maximum luminance value of the display-optimized output image PL_V_out, may be set in the settopbox once by polling it from a connected display (i.e. the display communicates its maximum displayable luminance PL_D to the settopbox), or when the circuit resides in a television this may be configured by the manufacturer, etc.

The luminance mapping function F_L may in some embodiments vary per incoming image (in other variants it may be fixed for a multitude of images), and is input from some source of metadata information 512 (e.g. this may be broadcasted as SEI messages, read from a sector of a memory like a blu-ray disk, etc.). This data establishes the normalized heights of the normalized metrics (Sm1, Sm2, etc), on which desired positions for the PL_D value can be found from the mathematical equation of the metric.

When an input image 513 is input, successive pixel luminances (e.g. Ln_in_pix_33 and Ln_in_pix_34; or lumas) run through the color processing pipeline which applies the display adaptation, and corresponding output luminances result, such as Ln_out_pix_33.

Note that there is nothing in this approach which specifically caters for a minimum black luminance.

This is because the normal approach would be as follows. The black level is very dependent on the actual viewing situation, which can be even more variable than the display characteristics (i.e. firstmost PL_D). All kinds of effect can happen, ranging from physical illumination aspects to the optimal configuration of the light sensitive molecules in the human eye.

So one makes a good image "for the display", and that's all (i.e. for how much more capable an intended HDR display is—brightness-wise—than a typical SDR display). Then where needed one can post-correct somewhat later on for the viewing situation, which would be an (undefined) ad hoc task left to the display.

Ergo, one typically assumes that the display can display all necessary pixel luminances as coded in the image (which for the moment we assume is already an MDR image optimized for the PL_D value, i.e. has at least some pixel regions in the image going up to PL_D typically) up to its variable high luminance capability, i.e. PL_D. That is because one in general doesn't want to suffer the harsh results of white clipping, but as said the blacks of the image are often not that interesting.

The blacks may be visible "mostly" anyhow, so if some of it is somewhat less well visible, that is not of paramount importance. At least one can optimally squeeze potentially quite bright pixel luminances of the master HDR grading into the limited upper range of the display, e.g. above 200 nit, say from 200 to PL_D=600 nit (for master HDR luminances up to e.g. 5000 nit).

This is akin to assuming the black is always zero nit, for all images, and all displays (at least approximately). Clipping of white colors can be a much more visually annoying property than losing some of the blacks, in which oftentimes still something can be seen, be it less comfortably.

However, sometimes that approach is not sufficient, as under significant surround light in the viewing room (e.g. a living room of a consumer television viewer with large windows during daytime), quite a significant sub-range of the darkest luminances may become invisible, or at least insufficiently visible. This would be different from the surround light situation in the video editing room in which the video is created, which may be dim, or even dark.

Therefore, one may need to raise the luminance of those pixels, e.g. with a control button on the display typically (a so-called brightness button).

If we take a television electronic behavior model as in Rec. ITU-R BT.814-4 (July 2018), the television in a HDR scenario gets luma+chroma pixel colors (in fact driving the display), and converts these (according to standard colorimetrical calculations) to non-linear R',G',B' non-linear driving values for driving its panel. The display will then process these R',G',B' non-linear driving values with the PQ EOTF to know which front screen pixel luminances to display (i.e. how to drive the e.g. OLED panel pixels, or the LCD pixels, where there typically is still an internal processing accounting for the electro-optical physical behavior of the LCD material, but that aspect is irrelevant for the present discussion).

The control knob, e.g. on the front of the display, can then give a luma offset value b (for the moment when the 2% above minimum black patch in a PLUGE or other test pattern becomes visible whilst the −2% black is not).

If the original, uncorrected display behavior is:

$$LR\_D = EOTF[\max(0, R')] = PQ[\max(0, R')] \quad \text{[Eqs. 1]}$$
$$LG\_D = EOTF[\max(0, G')] = PQ[\max(0, G')]$$
$$LB\_D = EOTF[\max(0, B')] = PQ[\max(0, B')]$$

In this equation LR_D is the (linear) amount of red contribution to be displayed, to create a particular pixel color having a particular luminance (in (partial) nits), and R' is the non-linear luma code value, e.g. 419 out of 1023 values in a 10 bit coding.

The same will happen for the blue and green component. If one e.g. needs to make a particular color of 1 nit (total luminance of that color to the eye), one needs e.g. 0.33 units of blue, and the same for red and green. If one needs to make 100 nits of that same color, one can then say that LR_D=100*0.33 nits.

If one now controls this display driving model via the luma offset knob, the general equations become:

$$LR\_D\_c = EOTF[\max(0, a*R' + b)], \quad \text{[Eqs. 2]}$$
$$\text{with } a = 1 - b/OETF[PL\_D], \text{ etc.}$$

Instead of displaying the zero black of the image somewhere hidden in the invisible display blacks, with this approach one raises it to just the level where the blacks happen to become sufficiently discriminable (note that for consumer displays other mechanisms than the PLUGE may be used, e.g. viewer preference, potentially leading to another possibly sub-optimal though viewer-preferred and usable value of luma offset b).

This is a post-processing step of the display, after the creation of the optimally re-graded image. I.e. first the optimally theoretically re-graded image is calculated by the decoder, e.g. first mapping to a reconstructed master HDR image, and then luminance re-mapping to e.g. a 550 nit PL_V MDR image, i.e. taking into account the brightness capability PL_D of the display. And after this optimal image has been determined according to the ideal vision of the movie creator, it is further mapped by a display taking into account expected visibility of the blacks in the image.

According to the inventor a problem is that this is rather a crude manner of viewing room surround light level adaptation of to be displayed images. An alternative manner was developed.

SUMMARY OF THE INVENTION

A visually better looking image for various surround illumination levels can be obtained by a method of processing an input image to obtain an output image, comprising:
obtaining for the pixels of the input image starting lumas (Yn_CC),
obtaining a minimum luminance of a targeted display (mL_VD), the targeted display corresponding to an end-user display (210), which end-user display is to be supplied with the output image to display it;
obtaining a minimum luminance of the end-user display (mL_De) in a viewing room,
wherein the minimum luminance of the end-user display (mL_De) is dependent on an amount of illumination in the viewing room;
calculating a difference (dif) by subtracting the luminance of the end-user display (mL_De) from the minimum luminance of a targeted display (mL_VD);
converting the difference (dif) to a luma difference (Ydif) by applying the opto-electronic transfer function (OETF_psy) with the difference as input to the opto-electronic transfer function (OETF_psy), which yields the luma difference as output;
mapping the starting lumas by applying a linear function which applies:
a) as additive factor: the luma difference multiplied by −1.0,
b) as a linear multiplicative factor: the luma difference increased by the value 1.0, which multiplicative factor is multiplied by the starting lumas,
the sum of the two yielding mapped lumas (Yim);
converting the mapped lumas (Yim) by applying the inverse of the opto-electronic transfer function to obtain normalized intermediate luminances (Ln_im);
subtracting a second minimum luminance of an end-user display (mL_De2) divided by a maximum luminance of the output image (PL_O) from the intermediate luminances (Ln_im), and scaling the subtraction by 1.0 minus the result of dividing the second minimum luminance of an end-user display (mL_De2) by the maximum luminance of the output image (PL_O), to obtain final normalized luminances (Ln_f);
multiplying the final normalized luminances (Ln_f) by the maximum luminance of the output image (PL_O), to obtain output luminances; and
outputing the output luminances in a color representation of pixels of the output image.
The starting lumas may e.g. be calculated if input luminances (L_in) are input, by applying an opto-electronic transfer function (OETF_psy) to input luminances (L_in) of the input image. Instead of the starting lumas being directly defined from the input luminances by applying an OETF, any further luma-to-luma mapping may be involved to obtain the starting lumas, in particular a luma mapping which optimizes the distribution of the lumas in the image for a particular display capability. In some methods or apparatuses the input image pixel colors may have a luma component.

Although the targeted display and specifically the minimum luminance of the targeted display (mL_VD) corresponds to an (actual) end-user display (210), in particular a display of a consumer having a specific limited maximum luminance, the targeted displays are still characterizers about an ideal display on which the content is to be displayed, i.e. technical properties of the image (defined by a metadata-based co-association of technical specifics of an ideal display) more so than of any particular actual display.

The method uses two different characterizing values for the minimum of the display, one mL_De which includes the black behavior of the display itself (e.g. LCD leak light), and the other mL_De2 which is only dependent on the surround illumination of the viewing room (e.g. screen reflections) but not on the physical display black, so that factor would be zero in complete darkness (i.e. assumed to be zero-ed). Because the psychovisual correction takes into account both black offsets, but the final compensation only takes into account the surround light (amounting to keeping the image black level).

The opto-electronic transfer function (OETF_psy) which is used is preferably a psychovisually uniform opto-electronic transfer function. This function is defined by determining (typically experimentally in a lab) the luminance-to-luma mapping function shape so that a second luma which is a fixed integer N lumas higher than a first luma, selected anywhere on the range of lumas, approximately corresponds to a similar difference in perceived brightness to a human observer.

I.e. human vision is non-linear, ergo it doesn't experience the difference between 10 nit and (1.05)*10 nit the same as e.g. the difference between 2000 nit and (1.05)*2000 nit, and that uniformized perception curve also depends on what the human is watching, i.e. in particular the dynamic range of the display being watched (in a particular surround), i.e. its maximum PL_D and minimum luminance.

So ideally one defines for the processing an OETF (or it inverse EOTF) which has the property:
If one takes any first luma, e.g. in 10 bit luma_1=10. And then one moves e.g. N=5 luma codes higher, one gets the second luma luma_2=15. This corresponds to a change in brightness sensation (i.e. the value which characterizes what the human viewer experiences as the brightness of a displayed patch, with a certain physically displayed luminance; which can be determined by applying the EOTF).

So assume on a range of 1-200 of brightnesses, luma 10 gives a brightness impression of 5, and luma 15 gives an impression of 7, i.e. 2 units of brightness brighter.

Then one can take two lumas which code the brighter luminances, e.g. 800 and 800+5. Then the luma scale is visually approximately uniform if the viewer experiences the same brightness differences due to the luma difference. E.g., luma 800 may give a brightness perception of 160, and luma 805 will look like a brightness 162, i.e. again 2 units difference in brightness. The function doesn't have to be exactly a brightness determining function, as a perceptually reasonably uniformized luma definition will already work nicely.

The effects of any change due to luminance processing is visually less objectionable if done in such a psychovisually uniform system (as the brain may easier counteract).

The minimum luminance of a targeted display (mL_VD) is—like the maximum luminance of a virtual target or targeted display that can be associated with an image, but says something about the image capabilities rather than any specific actual display—must be understood. It is again an ideal value, which is associated with the image, as the image representation is made associated with metadata which characterizes the image on a corresponding ideal targeted display. It is not the minimum achievable (displayable, i.e. typically viewable or discriminable) luminance a.k.a. black luminance of any actual, end-user display, because those will be compared in the specific approach of the algorithm. It is however a variable minimum which is associated with the actual end-user display, and in particular as shown below the end-user display maximum luminance (PL_D), but also the minimum luminance the image creator elected for its reference gradings (his master HDR image and corresponding typically SDR image). All of those can be, for various reasons, selected, but they must be in technical correspondence as the present innovation warrants. So the correspondence involves a 1-to-1 relationship between coupled or to be coupled selectable end-user displays and the value of the minimum luminance of a targeted display (mL_VD), which as shown in the embodiments can be calculated. Important is that there is such a minimum luminance of a targeted display (mL_VD).

The minimum luminance of the end-user display (mL_De) is also variable, but it will depend on an actual viewing situation, i.e. some end-user display which is present in some viewing environment, like a living room for watching television in the evening. It will have display-dependent properties, but vary mostly depending on the viewing environment situations (e.g. how many lamps are there, in which positions in the room, and which ones are switched on respectively off, etc.).

The maximum luminance of the output image (PL_O) should be understood as a maximum possible luminance of the output image, not necessarily the luminance of any pixel present in a particular image of a temporally successive set of images (video). For an image it would be defined as the maximum that can occur (e.g. represented by the maximum luma code in an N-bit system), and typically so annotated as image describing metadata, and if that images is optimized for a particular display, it would be the maximum displayable luminance, e.g. by setting a maximum driving signal to its driver, which in turn typically corresponds to a maximum energy output the display can achieve, and in particular the luminance of light for this driving (i.e. typically the brightest pixel that any actual display can display).

The luminance of the output image is understandably dependent on which kind of situation of deriving an output image one has. The invention may e.g. reside in a system which gets images already optimized for the maximum luminance capability of the display. E.g. the display indicates to the source of images that it is a 1000 nit display, i.e. needs PL_V_HDR=1000 nit optimized images as input. That embodiment will then do the corresponding optimization of the darkest luminances, for any—still variable—viewing environment illumination situation. In that case PL_O will just stay the PL_V_HDR.

In other embodiments one will also take into account that the display has a lower PL_D than the PL_V_HDR of the input image(s), ergo, the method will do a display adaptation (a.k.a. display optimization), which comprises a step arranged to calculate a display-optimized luminance mapping function (FL_DA) based on a reference luminance mapping function (F_L) and a maximum luminance of an end-user display (PL_D), and a step of using the display-optimized luminance mapping function (FL_DA) to map input lumas (YN_CC0) of the pixels of the input image to output luminances, which will form the starting lumas (Yn_CC) for the remainder of the processing, wherein the display-optimized luminance mapping function (FL_DA) has a less steep slope for the darkest input luminances compared to the shape of the reference luminance mapping function (F_L), and wherein the reference luminance mapping function specifies a relationship between luminances of a first reference image and luminances of a second reference image, which have a respective first reference maximum luminance and a second reference maximum luminance, wherein the maximum luminance of an end-user display (PL_D) falls in between the first reference maximum luminance and a second reference maximum luminance.

I.e., any of the possible embodiments to make a lesser variant of the specifically shaped F_L function (corresponding to the particular needed luminance re-mappings, a.k.a. re-grading needs, for the present specific HDR image or scene to obtain a corresponding lower maximum luminance secondary grading) as elucidated with FIGS. 4 and 5 or similar techniques can be used. The luminance mapping functions are represented as luma mapping functions, i.e. by converting both normalized luminance axes to luma axes via the appropriate OETF (the normalization using the appropriate maximum luminance value of the input and output image).

Specifically the secondary grading on which the F_L function is defined may advantageously be a 100 nit grading, which would be suitable for servicing most future display situations.

Advantageously the calculating of the display-optimized luminance mapping function (FL_DA) may e.g. comprise finding a position (pos) on a metric (SM) which determines positions for maximum luminance values, which position corresponds to the maximum luminance of an end-user display (PL_D), wherein a first endpoint of the metric corresponds to the first maximum luminance (PL_V_HDR) of the input image and a second endpoint of the metric corresponds to the maximum luminance of the second reference image, wherein the first endpoint of the metric is collocated, for any normalized input luma (Yn_CC0), on a point on a diagonal which has it horizontal and vertical coordinate equal to the input luma, and wherein the second endpoint is collocated with an output value of the reference luminance mapping function (F_L), as determined by a direction of the metric. So the first endpoint is on the diagonal, and the second endpoint is e.g. for a vertical metric direction straight above there where the locus of the F_L function lies, i.e. at a point which has as horizontal coordinate the specific (of all possible) input luma, and as output the output luma obtained by applying the F_L function: Yn_out=F_L (Yn_CC0), where the luminance mapping function is typically not represented in the domain of luminances itself, but by suitable OETF-ing of the coordinate axis typically in a psychovisually uniformized luma domain.

A number of advantageous apparatus embodiments can result from varying on the innovation, e.g.:

An apparatus for processing an input image to obtain an output image, comprising:
- an input unit for obtaining image starting lumas (Yn_CC), such as a circuit comprising first opto-electronic conversion circuit (601) arranged to apply an opto-electronic transfer function (OETF_psy) to input luminances (L_in) of the input image to obtain input image starting lumas (Yn_CC);
- a first minimum metadata input (693) to receive a minimum luminance of a targeted display (mL_VD), the targeted display corresponding to an end-user display (210), which end-user display is to be supplied with the output image to display it;
- a second minimum metadata input (694) to receive a minimum luminance of the end-user display (mL_De) in a viewing room,
- wherein the minimum luminance of the end-user display (mL_De) is dependent on an amount of illumination in the viewing room;
- a luminance difference calculator (610) arranged to calculate a difference (dif) by subtracting the luminance of the end-user display (mL_De) from the minimum luminance of a targeted display (mL_VD);
- a second opto-electronic conversion circuit (611) arranged to convert the difference (dif) to a luma difference (Ydif) by applying the opto-electronic transfer function (OETF_psy) with the difference as input to the opto-electronic transfer function (OETF_psy), which yields the luma difference as output;
- a linear scaling circuit (603) arranged to map the starting lumas by applying a linear function which applies as additive constant the luma difference multiplied by −1.0, and uses the luma difference increased by the value 1.0 as multiplier to multiply by the starting lumas, which yields mapped lumas (Yim);
- an electro-optic conversion circuit (604) arranged to convert the mapped lumas (Yim) by applying the inverse of the opto-electronic transfer function to obtain normalized intermediate luminances (Lim);
- a third minimum metadata input (695) to receive a second minimum luminance of the end-user display (mL_De2);
- a final surround adjustment circuit (605) arranged to subtract the second minimum luminance of an end-user display (mL_De2) divided by a maximum luminance of the output image (PL_O) from the intermediate luminances (Ln_im), and scaling the subtraction by 1.0 minus the result of dividing the second minimum luminance of an end-user display (mL_De2) by the maximum luminance of the output image (PL_O), to obtain final normalized luminances (Ln_f);
- a multiplier arranged to multiply the final normalized luminances (Ln_f) by the maximum luminance of the output image (PL_O), to obtain output luminances; and
- a pixel color output 699 to output the output luminances in a color representation of pixels of the output image.

The technical realization of the input unit or circuit will depend on the configuration, and which variant of input color definition is input into the apparatus, but the useful input for the apparatus, at the output of the input stage, are the starting lumas.

An apparatus (in any of the embodiment technical element combinations) for processing an input image further comprising a maximum determination circuit (671) arranged to determine the maximum luminance of the output image (PL_O) as either the maximum luminance of an end-user display (PL_D) which is to display the output image, or a maximum luminance (PL_V_HDR) of the input image.

An apparatus (in any of the embodiment combinations) for processing an input image further comprising:
- a display optimization circuit (670) arranged to calculate a display-optimized luminance mapping function (FL_DA) based on a reference luminance mapping function (F_L) and the maximum luminance of an end-user display (PL_D), and
- a luminance mapping circuit (602) arranged to apply the display-optimized luminance mapping function (FL_DA) to the input luminances, specifically represented as lumas, to obtain the output lumas (and therefore luminances),
- wherein the display-optimized luminance mapping function (FL_DA) has a less steep slope for the darkest input luminances compared to the shape of the reference luminance mapping function (F_L), and
- wherein the reference luminance mapping function specifies a relationship between luminances of a first reference image and luminances of a second reference image, which have a respective first reference maximum luminance and a second reference maximum luminance, wherein the maximum luminance of an end-user display (PL_D) falls in between the first reference maximum luminance and a second reference maximum luminance.

An apparatus for processing an input image wherein the second reference image is a standard dynamic range image with its second reference maximum luminance equaling 100 nit, or wherein a psychovisually uniform OETF and EOTF is applied by the circuits which apply them, or which has any specific variant of display adaptation in the display optimization circuit 670, etc.

In particular, the skilled person understands that these technical elements can be embodied in various processing elements like ASICs, FPGA's, processors, etc., and can reside in various consumer or non-consumer apparatuses, whether comprising a display or non-display apparatuses which can be externally connected to a display, and that the images and metadata can be communicated in and out over various image communication technologies such as wireless broadcasting, cable-based communication, and that the apparatuses can be used in various image communication and/or usage ecosystems such as e.g. television broadcasting, on-demand over the internet, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions.

In the drawings:

FIG. 4a and FIG. 4b, shows two possible variants of display adaptation, to obtain from a reference luminance mapping function F_L, which codifies the luminance re-grading needs between two reference images, a final display adapted luminance mapping function FL_DA, to be used to calculate the optimal display-adapted version of an input image, for a particular display capability (PL_D);

DETAILED DESCRIPTION OF THE EMBODIMENTS

Figure 6:
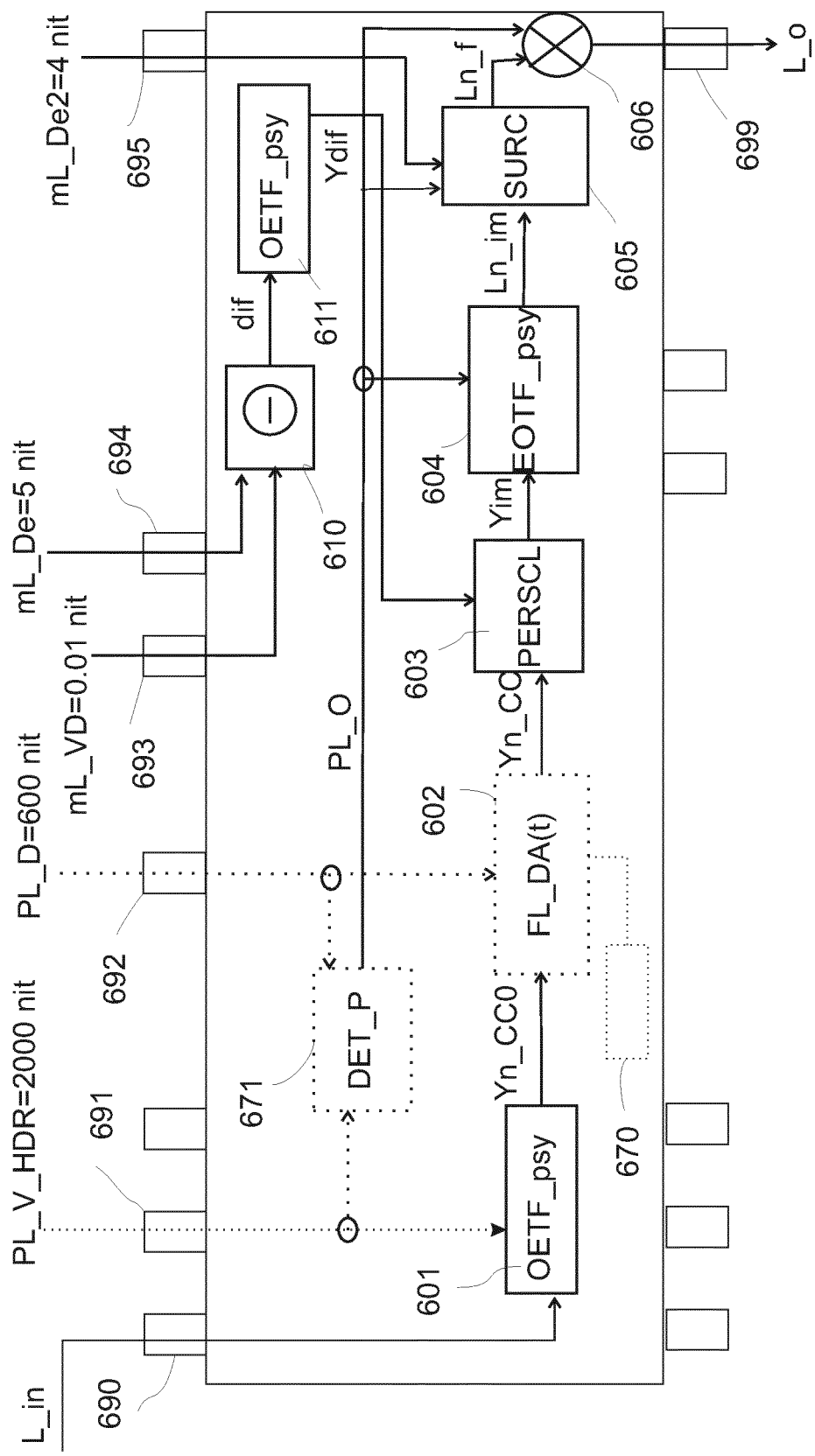
FIG. 6 shows an exemplary apparatus for elucidating technical elements regarding the environment-illumination-compensation processing.

FIG. 6 shows an apparatus to generically elucidate how to perform the elements of the present innovation, in particular color processing circuit 600. We will describe it generically and then give some specifics of embodiment variants. We assume the surround-light-adaptive color processing is performed inside an application specific integrated circuit (ASIC), although the skilled person will understand how to similarly implement the color processing in other material apparatuses. Some aspects will vary depending on whether this ASIC resides e.g. in a television display (typically the end-user display), or e.g. in another apparatus, e.g. a set-topbox or the like connected to the display, to do the processing for the display and supply it with already luminance-optimized images. (the skilled person can also map this apparatus construction chart to a method flow chart for a corresponding method).

Input luminances (L_in) of a to be processed input image (which we can assume, without wanting to lose generality, to be the master HDR image MAST_HDR) are after being input via an image pixel data input 690 first transformed into corresponding lumas (e.g. 10 bit coded lumas), For that an opto-electronical transfer function is used, which will typically be fixed in the apparatus by its manufacturer (although it could be configurable).

It is useful to employ a perceptually uniform OETF (OETF_psy).

We will assume the following OETF to be used (defining as output its luma Yn_CC0):

$$Yn\_CC0 = v(L\_in; PL\_V\_in) = \log[1 + (RHO - 1) * \text{power}(L\_in; p)]/\log[RHO],$$

in which RHO is a constant which depends of an input maximum luminance PL_V_in, by the equation RHO (PL_V_in)=1+32*power((PL_V_in/10,000);p), and p is the power of the power function, which is preferably equal to 1/(2.4) [Eqs. 3]

The input maximum luminance will be the maximum luminance associated with the input image (which is not necessarily the luminance of the brightest pixel in each image of a video sequence, but a metadatum characterizing the image or video, as an absolute upper value).

It may typically be configurable, and input via first maximum data input 691, as PL_V_HDR, e.g. 2000 nit. It may in other variants also be a fixed value for an image communication and/or processing system, e.g. 5000 nit, and therefore a fixed value in the processing of opto-electronic conversion circuit 601 (hence the vertical arrow denoting the data input of PL_V_HDR is shown dotted because it is not present in all embodiments; note the open circles symbolize a branch-off of this data supply, to not confuse with overlapping data buses which do not mix).

Subsequently, there may in some embodiments be a further luminance mapping by luminance mapping circuit 602, to obtain the starting lumas Yn_CC which the present method or color processing apparatus will optimally adapt for a specific viewing environment. Such a further luminance mapping may typically be a display adaptation to pre-conform the image to a specific display maximum luminance PL_D of a connected display.

A simpler embodiment does not have this optional luminance mapping present, so we will first explain the color processing assuming that a 2000 nit environment-optimized image is to be calculated for an incoming 2000 nit master HDR image (or the fixed 5000 nit HDR image situation), i.e. with the maximum luminance value remaining the same between input and output image. In this case the starting lumas Yn_CC will simply be equal to initial starting lumas Yn_CC0 as output by the opto-electronic conversion circuit 601.

A linear scaling circuit 603 calculates intermediate luma Yim by applying a function of the type:

$$Yim = (Ydif + 1) * Yn\_CC - 1.0 * Ydif \qquad [\text{Eq. 4}]$$

The luma difference Ydif is obtained from (second) opto-electronic conversion circuit 611. This circuit converts a luminance difference dif to a corresponding luma difference Ydif. This circuit will use the same OETF equation as circuit 601, i.e. also with the same PL_V_in value (and power value). The luminance difference dif is calculated by a luminance difference calculator 610, which receives two darkest luminance values, namely a minimum luminance of a targeted display (mL_VD) and a minimum luminance of an end-user display (mL_De) given the particular illumination characteristics of a viewing room, and calculates:

$$dif = mL\_VD - mL\_De \qquad [\text{Eq. 5}]$$

mL_De will typically be a function of (typically the addition) on the one hand a fixed display minimum black of the end-user display (mB_fD) and a luminance which is a function of the amount of surround light (mB_sur). A typical example of display minimum black (mB_fD) would be the leak light of an LCD display. If such a display is driven with a code which is indicating perfect (i.e. zero photons to be output, ideally) black, due to the physics of the LCD material it will still always output e.g. 0.05 nit of light, so-called leak-light. This is irrespective of the surround light in the viewing environment, so that would be true in a perfectly dark viewing room.

The values of mL_VD and mL_De are typically obtained via first minimum metadata input 693 and second minimum metadata input 694, e.g. from an external memory in the same or a different apparatus, or via a circuit from a light measurement device, etc. The maximum luminance values required in a particular embodiment, such as e.g. the maximum luminance of a display (PL_D) which is to display the color processed output image, are typically input via input connectors like second maximum metadata input 692. The output image colors will be written out on pixel color output 699 (the skilled person can understand how to realize this as various technical variants, e.g. pins of an IC, a standard video cable connection like HDMI, a wireless channel-based communication of the pixel color data of the image, etc.).

The exact determination of the luminance which is a function of the amount of surround light (mB_sur) [which we shall shorthand call surround black luminance] is not a quintessential aspect of our present innovation as it can be determined in several alternative manners. E.g., a viewer can use a test signal, such as the PLUGE or a more consumer-friendly variant, to determine a value of the luminance mB_sur which he thinks is representative of the masking black, which will typically result from reflection on the front screen of the display. We can even assume that the viewer just sets a value, whether for a specific evening, or given that usually consumers leave their room lighting configuration fixed, e.g. upon purchase of the display. Or it could even be a value that the television manufacturer baked-in as an averagely well working value for at least one of typical consumer viewing situations. In case this method is used for adapting the luminance for viewing on a mobile device, it may be typical that the viewing environment is not relatively stable (e.g. one may be watching a video in a train, and the lighting level could change from outdoors to indoors when the train goes into a tunnel).

In such cases one may employ a time-filtered measurement of e.g. a built-in illumination meter (not measuring too often to not wildly adapt the processing over time, but e.g. when one sits on a bench in the sun, and then walks indoors, etc.).

Such a meter typically measures an average amount of light falling onto it (in lux) ergo also on the display.

Although different photometric quantities, a lux-value can be converted to a surround black luminance by the well-known photometric equation:

$$mB\_sur = R * Ev/pi \qquad [\text{Eq. 6}]$$

In this equation, Ev is the surround environment illuminance in lux, pi is the constant 3.1415, and R is a reflectivity of the display screen. Typically the maker of the mobile display will put that value in the equation.

For normal reflecting surfaces in a surround, e.g. a wall of a house, with a color somewhere between average grey and white, one may assume an R value of approximately 0.3, i.e. as a rule of thumb say that the luminance value is about $\frac{1}{10}^{th}$ of a cited illuminance value in lux. The fronts of displays should reflect far less light: depending on whether special antireflection technologies have been employed, the R-value may e.g. be around 1% (but could be higher, towards an 8% reflectivity of glass, which may especially be a problem in brighter viewing surrounds).

$$\text{Ergo, } mL\_De = mB\_fD + mB\_sur \qquad [\text{Eq. 7}]$$

Figure 7:
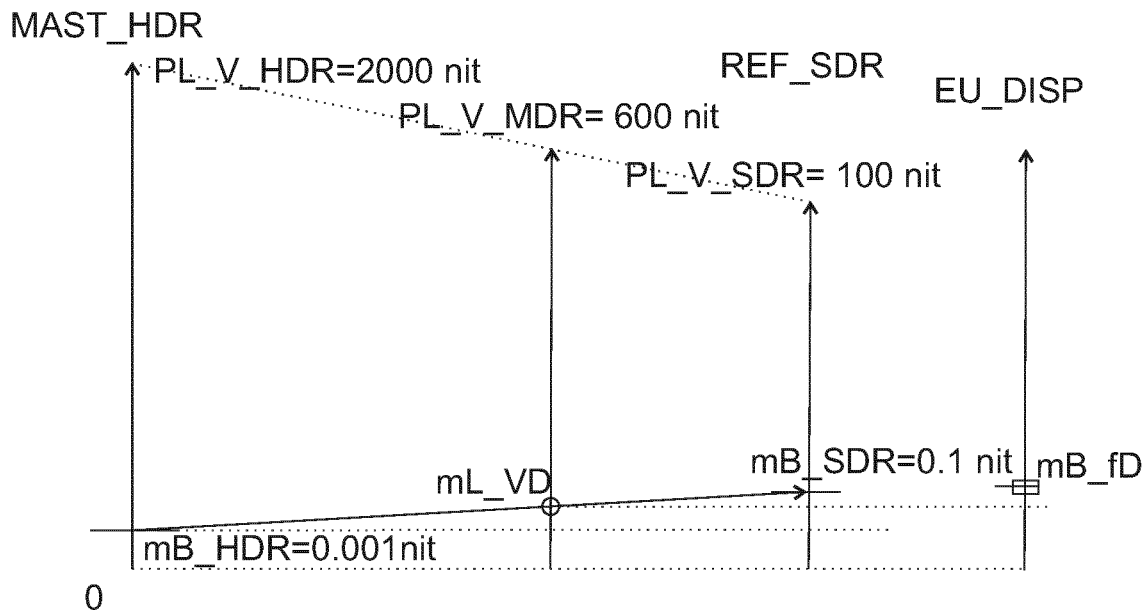
FIG. 7 explains the correlating concepts of virtual targeted displays, in particular the minimum luminance of a targeted display (mL_VD), and the relationship or relatability to actual displays, like typically an end-user display of a viewer for which the luminance re-mapping is performed.

The technical meaning of the value of the minimum luminance of a targeted display (mL_VD) will be further elucidated with FIG. 7.

The first three luminance ranges starting from the left side are in fact "virtual" display ranges, namely ranges that correspond to images, rather than necessarily actual displays (i.e. they correspond to targeted displays, i.e. displays that the image is ideally to be shown on, but which display potentially no consumer owns). These targeted displays are co-defined because images are specifically created (i.e. the luminances are graded to particular desired object luminances) for a targeted display: e.g. explosions cannot be very bright on a 550 nit display, so the grader may want to lower the luminance of some other image objects, so that the explosion at least appears somewhat contrasty. But it may well be that nobody owns such a display, and the image still needs to be optimized by display adaptation to the actual display any particular viewer owns. The range of physically displayable luminances on this end-user display is shown as the rightmost luminance range (EU_DISP).

This information, of the one or more targeted displays, constitutes metadata, some of which is typically communicated together with the image itself, i.e. together with the image pixel luminances.

Figure 8:
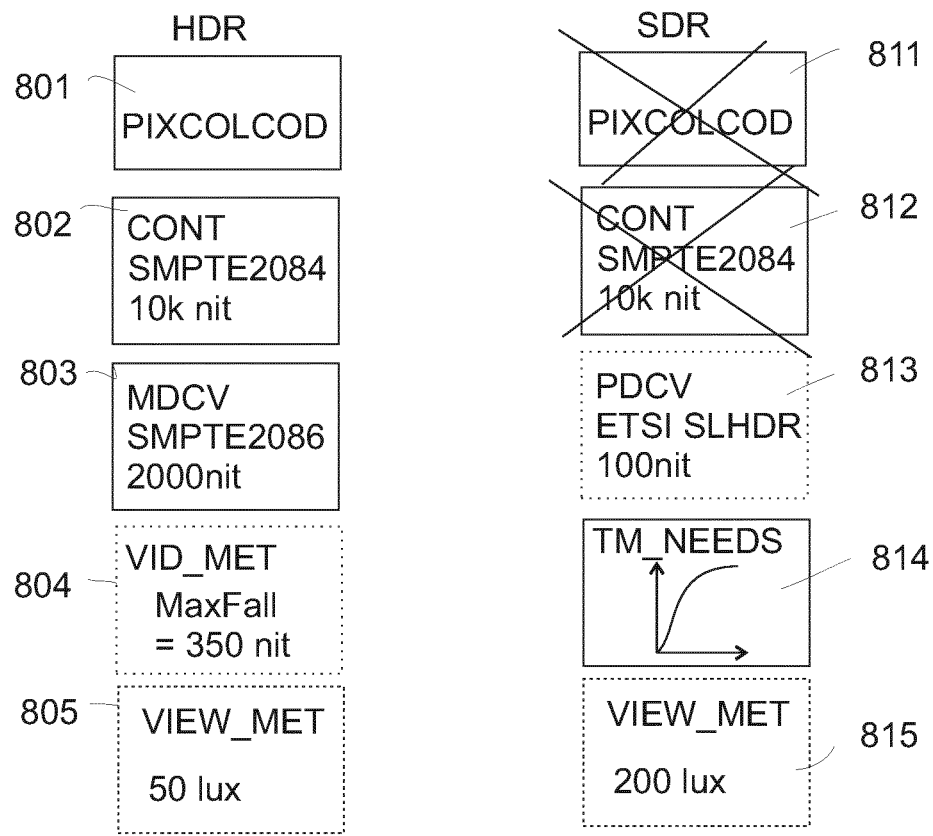
FIG. 8 explains some of the categories of metadata that are available for (e.g. typically co-communicated with the pixel color images) a future-proof professional HDR coding framework, so that any receiver has all data available it may need or at least elegantly make use of, in particular for optimizing the received images for a specific final viewing situation (display and environment)

Because this approach for characterizing (encoding) HDR image deviates significantly from the legacy SDR image coding, and these aspects have only been invented recently, and as important technical elements should not be misunderstood, for the benefit of the reader we summarize needed concepts with FIG. 8.

HDR videos are richly supplemented by metadata because so many aspects can vary (e.g. whereas SDR display's max. luminance always ranged around 100 nit, now people can have displays of considerably different display capabilities e.g. PL_D equaling 50 nit, 500 nit, 1000 nit, 2500 nit, and in the future maybe even 10,000 nit; the content characteristics like the maximum codeable luminance of the video PL_V may also vary considerably, and therefore the distribution of the luminances between dark and bright that a grader will make for a typical scene will also majorly vary between a typical SDR image and any HDR image, etc.), and one should not run into trouble because of insufficient control over those various slippery ranges.

As explained above, one should get at least one pixelated matrix of pixel colors, comprising at least pixel lumas, otherwise (even if wrongly displayed colorimetrically) one would not even see an image geometry. As said above, one can communicate two different dynamic range images (which may double as two reference gradings for indicating the luminance re-grading needs of the specific video content when needing to make images of different dynamic range, like an MDR image), by actually communicating only one image per time instant.

We will assume we communicate a master HDR image, per se, so a first data set 801 (the image colors) contains the color component triplets for the pixels of the image which gets communicated, and becomes input for the color processing circuit e.g. residing in a receiving-side television display. Typically such images are digitized as a (e.g. 10 bit) luma and two chroma components Cr and Cb (although one could also communicate non-linear R'G'B' components). But one needs to know which luminance the luma 1023, or e.g. 229 represents.

For that one co-communicates container metadata 802. We will assume that the lumas are defined e.g. according to the Perceptual Quantizer EOTF (or its inverse the OETF), as standardized in SMPTE ST.2084. This is a generous container which could specify lumas up to 10,000 nit, even though currently no images would be produced with pixel luminances so high, so one could say it is a "theoretical container", which contains the actually used luminances up to say 2500 nit. (note that one would also communicate primary chromaticities, but those details would only encumber the present elucidation needlessly).

Where it becomes interesting, is the actual encodeable (or encoded) maximum pixel luminance of the video, and this is encoded in another video-characterizing metadatum, which typically is the master display color volume metadata 803.

This is an important luminance value for the receiving side to know, since even if a display does not care about the specific details of how to remap all luminances along the range (at least according to the desired display adaptation of the content creator), knowing the maximum still guides what to best do roughly with all the luminances, since one at least knows what luminance the video will not go above, for any image pixel.

For our 2000 nit example, this master display color volume (MDCV) metadata 803 would comprise the master HDR image maximum luminance i.e. the PL_V_HDR value of FIG. 7, i.e. characterizing the master HDR video (which in the example also gets actually communicated as SMPTE 2084-defined PQ pixel lumas, but that aspect can also at present be ignored, as we can understand the principles of the innovative color processing as if (linear) pixel luminances per se were incoming, as the skilled person knows how to convert between the two).

This MDCV is the "virtual" display, i.e. the targeted display, for the HDR master image. By indicating this in metadata, the video creator is indicating in his communicated video signal to receiving-side actual end-user displays that somewhere in his movie there may be pixels as bright as 2000 nit, so the end-user display better takes that into account when doing its processing on the luminances of the present image.

These (actual) luminances of a set of images, are actually yet another aspect, so there is a further, video-related metadata set 804. This gives properties not of an associated display (i.e. e.g. the maximum possible in the video), but further information of an actual video. To easily understand this, one can imagine that two videos are being made annotated with the same MDCV PL_V_HDR (and EOTF): a first video is a nighttime video, and therefore actually in no image reaches a pixel luminance higher than say 80 nit (although it is still specified on the 2000 nit MDCV; and also if it were another video it could have some flashlight in at least one image which has a few pixels reaching the 2000 nit level, or almost that level), and a second video, specified/created according to exactly the same coding technology (i.e. annotated with the same data in 802 and 803) consists only of explosions, i.e. mostly has pixels above 1000 nit.

On the one hand one may want to say something additionally about this video, but on the other hand, the skilled reader can understand that if one wants to re-grade both videos from their 2000 nit master representation to e.g. a 200 nit output representation, one will do so differently (one could scale the explosions simply by dividing the luminances by 10, whereas one could keep the luminances of the night scene identical in the master HDR and 200 nit output image).

A possible (optional for the present innovation, but explained nonetheless for completeness) useful metadatum in the set 804 annotating the communicated HDR image would be the average pixel luminances of all pixels of all time-sequential images, MaxFall being e.g. 350 nit. The receiving side color processing can then from this value understand that if it is dark luminances can be displayed as is i.e. unmapped, and if it is bright, so dimming may be in order.

One can also annotate the SDR video (i.e. the second reference grading image, showing how a SDR image must look which is according to the content creator as similar as possible to the master HDR image given the reduced dynamic range capability), even if one doesn't actually communicate it, i.e. one will only send this metadata (metadata 814).

So although some HDR codes may also send pixel color triplets comprising pixel lumas of the SDR image (Rec. 709 OETF-defined), i.e. SDR pixel color data 811, as explained above our elucidation example codec, the SLHDR codec, will not actually communicate this SDR image i.e. its pixel colors or anything depending on those colors, hence the cross-out (if there are no pixel colors communicated, one also need not communicate SDR container metadata 812 which indicates the container format how the pixel codes are defined, and to be decoded to linear RGB pixel color components).

What should ideally be communicated (although some systems may tacitly assume it) is the corresponding SDR targeted display metadata 813. In such a situation one will typically fill in the value of PL_V_SDR as equal to 100 nit.

Important for the present innovation, this is also where one will typically fill in the value of the supposed minimum black of the theoretical targeted SDR display for which the video creator graded his movie, i.e. the SDR reference minimum black mB SDR.

E.g. if the creator assumes he makes his video for a display which cannot go deeper than 0.1 nit (because of LCD leak light e.g.), he may not want to make too much important image object pixel luminances close to this value, but e.g. start from 0.2 nit SDR image pixels, and probably somewhat above that, most pixels above the 1 nit level. There will be a similar value characterizing the master HDR image, or more precisely its associated targeted display, namely the HDR minimum black mB_HDR (in metadata 803).

The re-grading needs are image-dependent, so they will, according to our elected elucidation codec as explained above, advantageously be encoded in SDR video-metadata 814. As explained above, one may typically communicate one (or more, even for a single time instant) image-optimized luminance mapping functions for mapping the normalized-to-max-1 HDR luminances (or lumas) to normalized-to-max-1 SDR luminances or lumas (i.e. the F_L reference luminance mapping function shape (the precise manner in which one codes these functions is irrelevant for the present patent application, and examples can be found in the above-mentioned ETSI SLHDR standard). Since now with this function shape (juncto the metadata of the maximum luminance of the targeted displays, HDR and SDR) the needed re-mapping of all possible image pixel luminances is prescribed, further metadata regarding the image like e.g. maxFall is not really needed, although it could also be communicated.

This would already constitute a quite professional set of HDR video coding data, upon which one could apply our present surround-adaptive luminance remapping techniques.

However (and especially useful for contrast-optimization embodiments further detailed below) two further metadata sets could be added (in various manners), which is not yet well-standardized. It could also be that the content creator whilst using the Perceptual Quantizer, works under the tacit assumption that the video is created (and so ideally to be displayed when possible also at the receiving side if one wants the optimal look) in a viewing environment of a particular illumination level, e.g. 10 lux (whether a particular content creator has also tightly followed this illumination suggestion is another manner).

If one wants increased certainty, one could associate a typical (intended) viewing environment for which the master HDR image was specifically graded (HDR viewing metadata 805; optional/dotted). As said, one could be making a 2000 nit maximum master HDR image. But if this image was intended to be viewed in a 1000 lux viewing environment, the grader would probably not make too many subtle graded dark object luminances (like slightly differently dimly lit objects in a dark room seen through an open door at the back of a scene comprising a lit first room at the front), since the viewers brain would likely just see all of this as just "plain black", but the situation would be different if the image was typically made for dimmer evening viewing in a room of e.g. 50 lux, or 10 lux. One could also specifically make the re-grading to the SDR image, in particular the F_L function, for a typical more bright viewing situation, say 200 lux, and annotate that in SDR surround metadata 815, and receiving-side apparatuses could also employ that information to their advantage, if so desired (or one could communicate re-gradings for different SDR images of different intended viewing).

Returning to FIG. 7, we show a configuration in which one desires to make an output image for a 600 nit MDR display (by display adaptation), i.e. the output image needs to be a PL_V_MDR=600 nit output image.

In case we were to optimize according to the present innovation an output image with the same maximum luminance as the input image (the simple situation described above with FIG. 6), the value of the minimum luminance of a targeted display (mL_VD) would simply be the mB_HDR value. However, now we need to establish a minimum luminance for the MDR display dynamic range (as the appropriate value of the minimum luminance of a targeted display mL_VD). This will be interpolated from the luminance range information of the two reference images (i.e. in the FIG. 8 standardized embodiment explanation the MDCV and presentation display color volume PDCV typically co-communicated or at least obtainable in metadata 803 respectively 813).

The equation is as follows:

$$mL\_VD = mB\_SDR + (mB\_HDR - mB\_SDR) * \qquad [Eq. 8]$$
$$(PL\_V\_MDR - PL\_V\_SDR)/(PL\_V\_HDR - PL\_V\_SDR)$$

In this equation the PL_V_MDR value is selected equal to the PL_D display of the display to be supplied with display-optimized images.

Returning to FIG. 6, the dif value will be converted to a psychovisually uniform luma difference (Ydif), by applying in opto-electronic conversion circuit 611 the v-function of equation 3, substituting for L_in the value dif divided by PL_V_in (i.e. a normalized luminance difference), wherein as value of PL_V_in is used: in the case of making a surround-adjusted image with the same maximum luminance as the input master HDR image, the value PL_V_HDR; respectively for the scenario of display adapting to a MDR display the value of PL_V_in is the PL_D value of the display, e.g. 600 nit.

An electro-optic conversion circuit 604 calculates a normalized linear version of the intermediate luma Yim, the intermediate luminance Ln_im. It applies the inverse equation of Eqs. 3 (same definition equation for RHO). For the RHO value indeed the same PL_V_HDR value would be used in the simplest situation where the output image has the same maximum luminance as the input image, and there is merely adjustment of the darker pixel luminances. However, in case of display adaptation to an MDR maximum luminance, the PL_D value would be used for calculating the suitable RHO value which characterizes the specific shape (steepness) of the v-function. To realize this, an output maximum determination circuit 671 may be present in the color processing circuit 600. It will typically be a logic processor deciding for the configured situation whether to use as maximum luminance of the output image PL_O, i.e.

the value for determining the RHO of the EOTF applied by electro-optic conversion circuit 604, respectively PL_V_HDR or PL_D (the skilled person understands that in some specific fixed variants the situation may be configured in fixed equations).

A final surround adjustment circuit 605 performs a linear additive offset in the luminance domain, by calculating a final normalized luminance Ln_f with the equation:

$$Ln\_f = (Ln\_im - (mL\_De2/PL\_O))/(1 - (mL\_De2/PL\_O)) \quad [Eq.\ 9]$$

mL_De2 is a second minimum luminance of an end-user display (a.k.a. second end-user display minimum luminance), typically input via third minimum metadata input 695 (which may be connected via intermediate processing circuitry to a light meter). It is different from the first minimum luminance of an end-user display mL_De, in that mL-De does also contain a characterizing value of the physical black of the display (mB_fD), but mL_De does NOT, and only characterizes the amount of surround light deteriorating the displayed images (e.g. by reflection), i.e. it characterizes only mB_sur, to which it is typically equal.

Inside final surround adjustment circuit 605 the mL_De2 value is normalized by the applicable PL_O value, i.e. e.g. PL_D.

Finally, in most variants it may be advantageous if usual (i.e. not normalized) output luminances L_o come out, which can be realized by multiplier 606, which calculates:

$$L\_o = Ln\_f * PL\_O \quad [Eq.\ 10]$$

i.e. normalized with the applicable maximum luminance of the output image.

Figure 1:
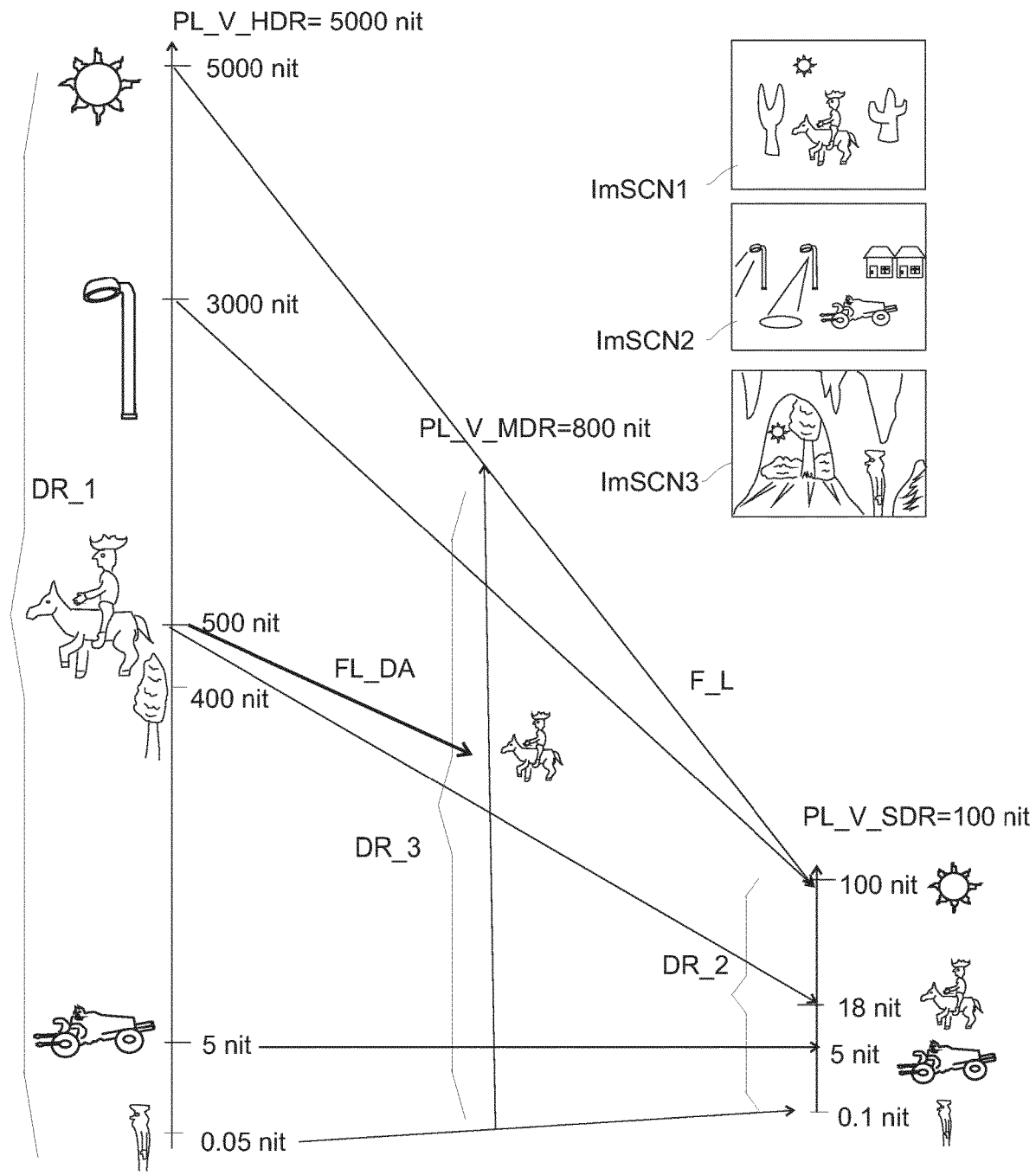
FIG. 1 schematically illustrates a number of typical color transformations which occur when one optimally maps a high dynamic range image to a corresponding optimally color graded and similarly looking (as similar as desired and feasible given the differences in the first and second dynamic ranges DR_1 resp. DR_2) lower dynamic range image, e.g. a standard dynamic range image of 100 nit maximum luminance, which in case of invertibility would also correspond to a mapping of an SDR image as received which actually encodes the HDR scene, to a reconstructed HDR image of that scene. The luminances are shown as locations on vertical axis from the darkest black to the maximum luminance PL_V. A luminance mapping function is symbolically shown by arrows which map average object luminances from their luminances on the first dynamic range to the second dynamic range (the skilled person knows how to equivalently draw this as a classical function, e.g. on normalized-to-1 axis, which are normalized by dividing by the respective maximum luminances)
Figure 2:
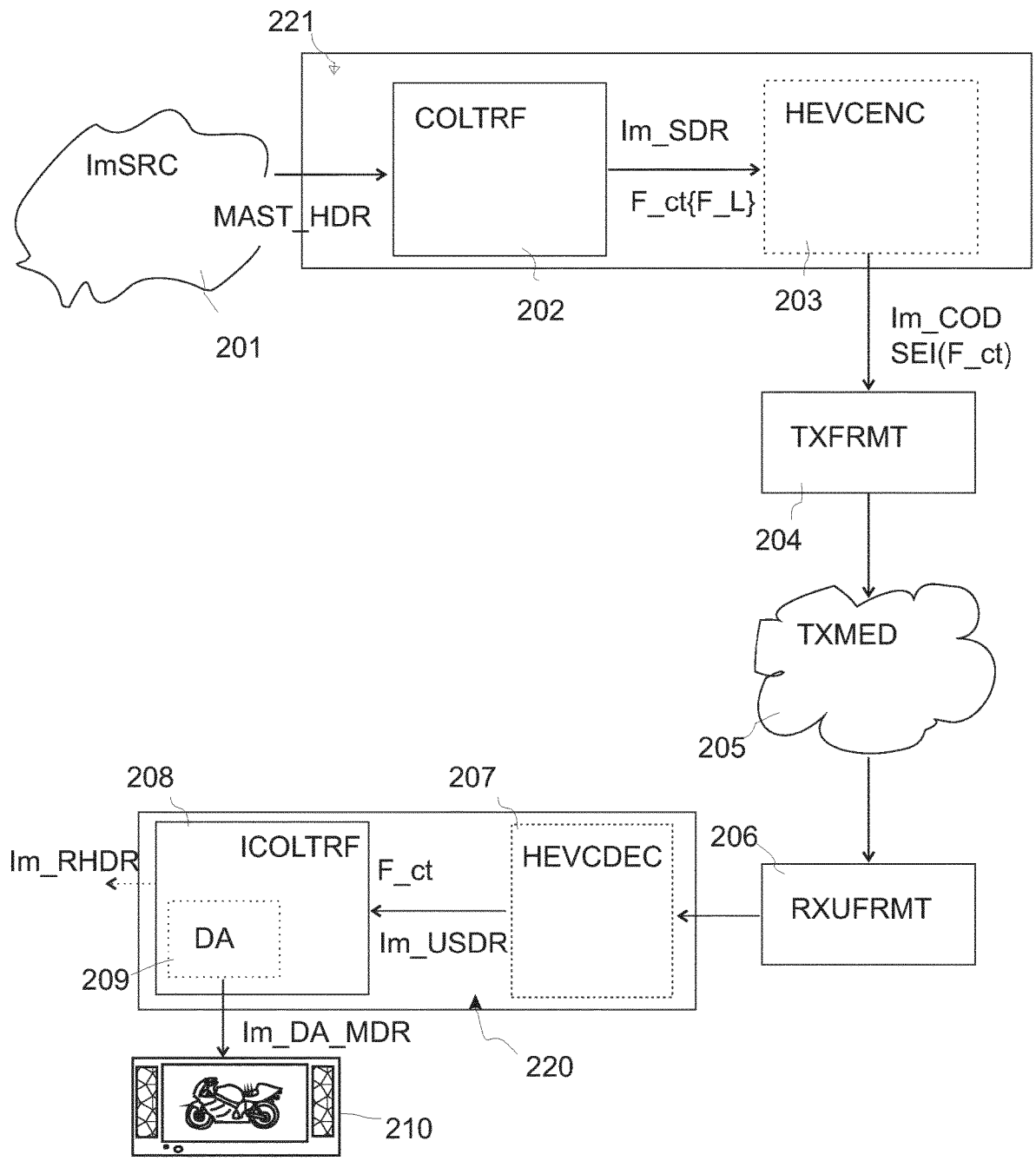
FIG. 2 schematically illustrates an high-level-view example of a technology to encode high dynamic range images, i.e. images capable of having luminances of at least 600 nit typically or more (typically 1000 nit or more), which applicant recently developed, which can actually communicate the HDR image either per se or as a corresponding luminance-regraded SDR image plus metadata encoding color transformation functions comprising at least an appropriate determined luminance mapping function (F_L) for the pixel colors, to be used by the decoder to convert the received SDR image(s) into HDR images(s)
Figure 3:
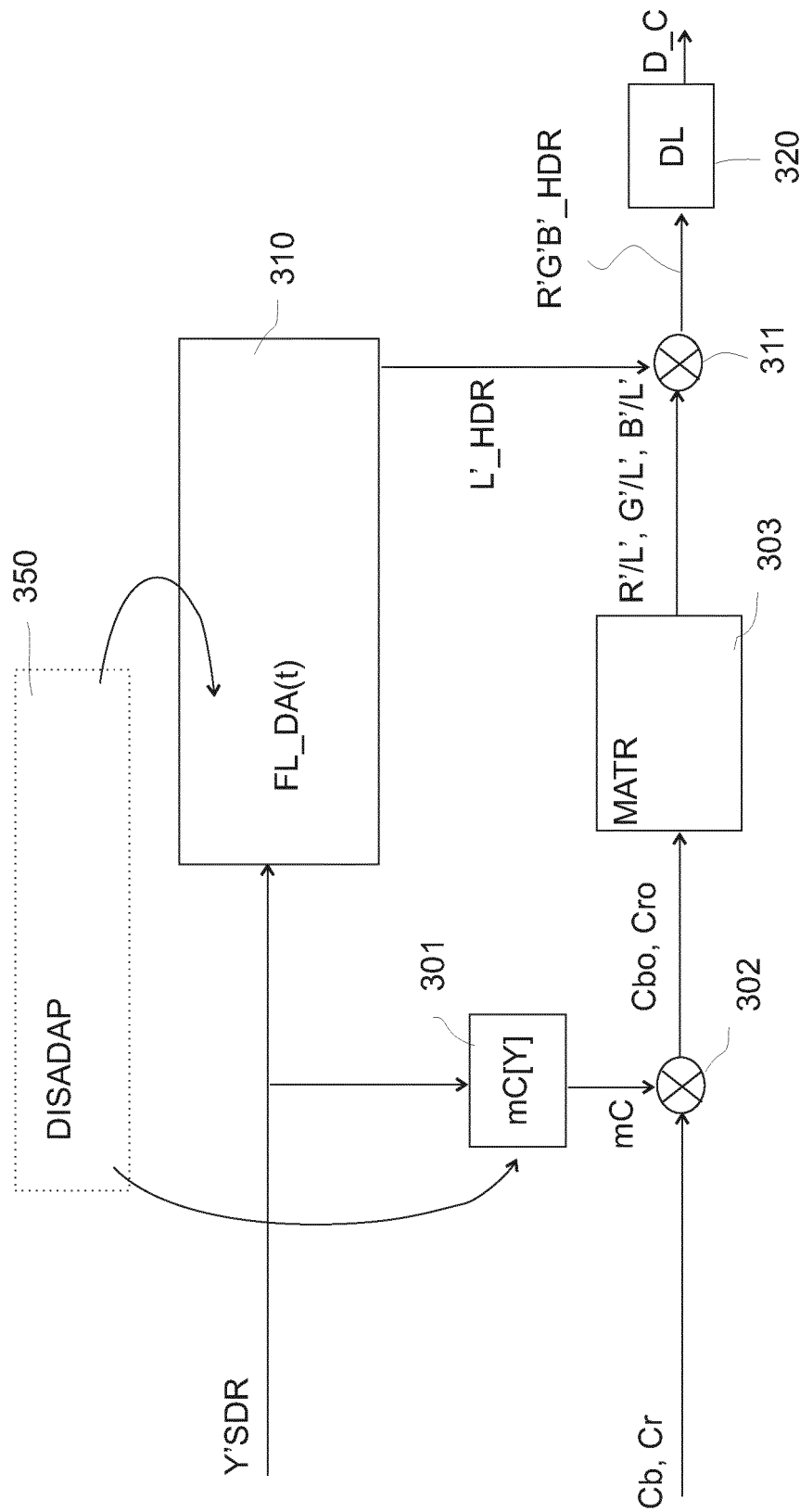
FIG. 3 shows details of the interior of the image decoder, in particular the pixel color processing engine, as a (non-limiting) preferred embodiment.
Figure 4:
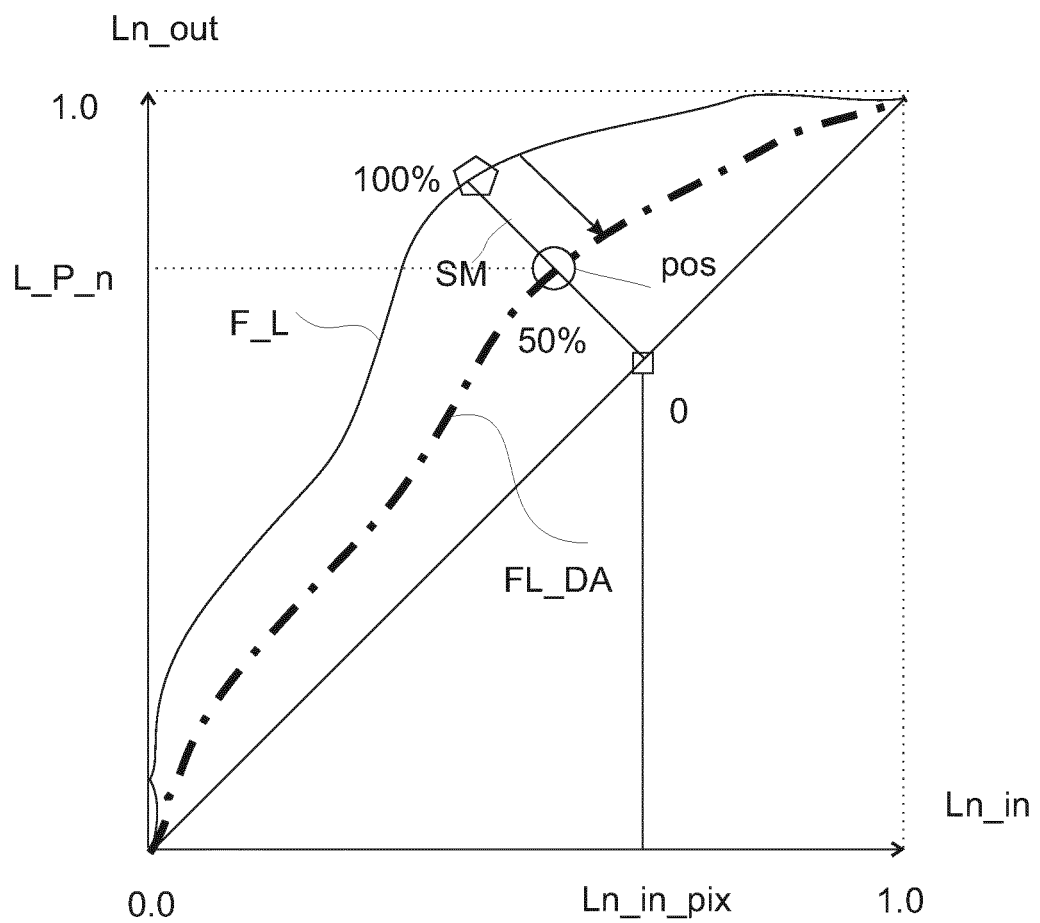
FIG. 4 which consists of sub-images
Figure 4:
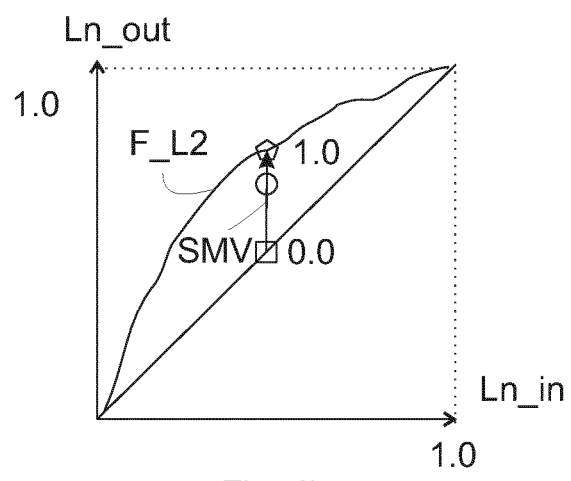
Figure 5:
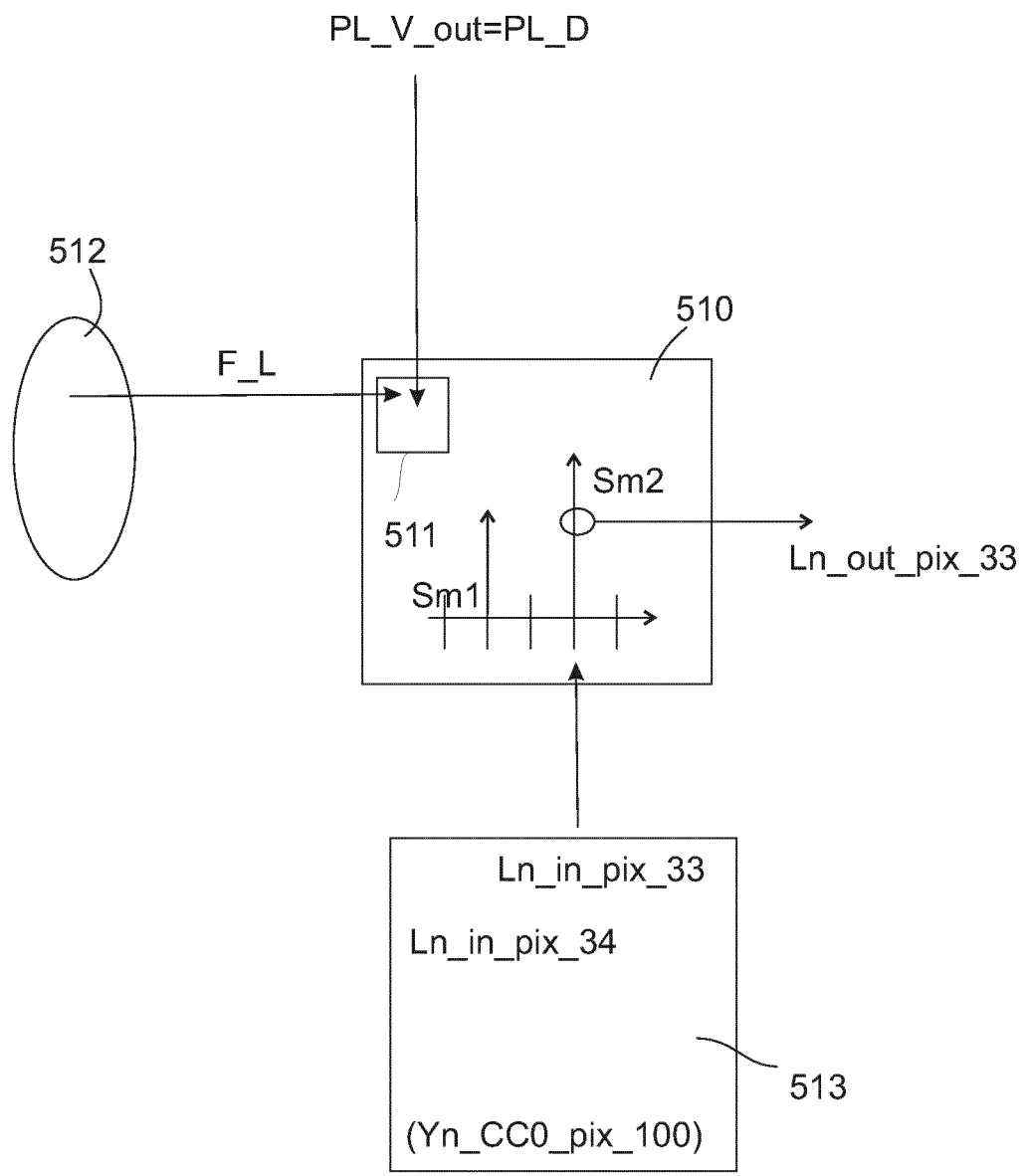
FIG. 5 summarizes the principles of display adaptation more generically, to more readily understand it as a component in the formulation of the present embodiments and claims.

Advantageously some embodiments may not only adjust the darker luminances for a surround light situation, but may do this in a color processing which also optimizes for a reduced maximum luminance of the display. In this scenario luminance mapping circuit 602 will apply the appropriate calculated display-optimized luminance mapping function FL_DA(t), which will typically be loaded into luminance mapping circuit 602 by display optimization circuit 670. The skilled person understands that the specific manner of display optimization is merely a variable part of such an embodiment, not quintessential to the surround adaptation elements, but some examples have been illustrated with FIGS. 4 and 5 (input into 670 of a configurable PL_O value has not been drawn to not make FIG. 6 overly complex, as the skilled person can understand this). Typically display adaptation will have a property of making a function lie closer to the diagonal for a lesser difference between input and output maximum luminance, i.e. the closer the desired maximum luminance of the output image (i.e. PL_V_MDR=PL_D) will be to the input maximum luminance (assume typically PL_V_HDR), and hence further from the maximum luminance of the second reference grading (typically PL_V_SDR), the more the shape of the function will be flat (i.e. an in-between F_L and diagonal, "lighter" re-grading function version FL_DA). Note that for downgrading one will typically have a convex function, meaning that the darker (than some midpoint) luminances are relatively boosted, at the cost of the compression of the brighter luminances. So for down-grading the FL_DA will typically have a less steep slope for boosting the darkest input luminances less than the F_L function (which does full re-grading to the other extreme end second reference grading).

Below is taught a second innovation, to optimize the contrast of the image, which is useful for brighter surrounds. These elements can be used in cooperation with the above surround-adjustment in various embodiments, but each innovation can also be applied separately from the other.

This method of processing an input image, to improve in particular its contrast, typically consists of:

obtaining reference luminance mapping function (F_L) associated with the input image, which defines its re-grading needs by the luminance (or equivalent luma) mapping to luminances of a corresponding secondary reference image.

The input image will typically double as the first grading reference image.

The output image will typically correspond to a maximum luminance situation intermediate between the maximum luminances of the two reference graded images (a.k.a. reference gradings), and will typically be calculated for a corresponding MDR display (a medium dynamic range HDR display, compared to the master HDR input image), with the relationship of the maximum luminance of the optimized output image being: PL_V_MDRPL_D_MDR.

A display adaptation—of any embodiment—is applied, as usual for the display adaptation for a lower maximum luminance display, but now in a specifically different manner (i.e. most of the technical elements of the display adaptation are left as is, but some change).

The display adaptation processing determines an adapted luminance mapping function (FL_DA) which is based on the reference luminance mapping function (F_L). This function F_L can be static i.e. the same for several images (in that situation FL_DA may still change, e.g. if the surround illumination changes significantly or upon a user control action), but it may also change over time (F_L(t)). The reference luminance mapping function (F_L) may typically come from the content creator, but may also come from an optimal re-grading function calculating automaton in any apparatus at the receiving side of the video images (just as for the offset-determining embodiments elucidated with FIGS. 6-8).

The adapted luminance mapping function (FL_DA) will be applied to the input image pixel lumas, to obtain output luminances, A key difference with the existing display adaptation (whilst the metric definition, i.e. the mathematics for locating various maximum luminances, and the orientation of the metric may be the same; e.g. the metric may be scaled by having one point on any position on the diagonal corresponding to a normalized-to-1 Yn_CC0 luma, and the other point is somewhere on the locus of the F_L function, e.g. when vertically above it will correspond to the output luma or luminance of F_L when the other coordinate of the metric positioning end point is the input Yn_CC0 luma to the function F_L), is that now the position on the metric (or more precisely all scaled versions of it by the shape of the F_L function) to obtain the adapted luminance mapping function (FL_DA) is calculated based on an adjusted maximum luminance value (PL_V_CO), rather than the value of the maximum of the needed output image (typically PL_V_MDR).

This adjusted maximum luminance value (PL_V_CO) may be determined by:
- obtaining a surround illumination value (Lx_sur);
- obtaining a relative surround light level (SurMult) by dividing a reference illumination value (GenVwLx) by the surround illumination value (Lx_sur);
- obtaining the maximum luminance value (PL_V_CO) as the result of multiplying the output maximum luminance (PL_V_MDR) by the relative surround light level (SurMult).

Whilst the surround illumination value (Lx_sur) could be obtained in various manners, e.g. the viewer empirically determine it by checking the visibility of a test pattern, it will typically result from a measurement by an illuminance meter 902, which will typically be suitably placed with respect to the display (e.g. on a bezel edge, and pointing roughly to the same direction as the screen front plate, or integrated on the side of a mobile phone, etc.).

The reference surround value GenVwLx may also be determined in various manners, but is typically fixed, because it is related to what is expected to be a reasonable ("average") surround illumination for a typical targeted viewing situation.

In case of television display viewing, this may typically be a viewing room.

The actual illumination of a living room may vary considerably, e.g. depending on whether the viewer is watching during the day or at night, but also in which room configuration (e.g., does he have small or large windows, and how is the display positioned compared to the windows, or in the evening: is one atmospheric lamp used, or is another member of the family doing precise work requiring a sufficient amount of illumination).

E.g., even during daytime, when suddenly the sky darkens significantly because a hail storm comes over, the outside illumination may be as low as 200 lux (lx), and indoors light levels from natural illumination are typically 100× lower, so indoors it will be 2 lx only. This starts having a nighttime appearance (especially strange for during the day), so this is a point where many users will typically switch on at least one lamp for comfort, effectively raising the level again. The normal outdoors level may be 10,000 lx in winter to 100,000 lx in summer, so that can be 50 times or more brighter.

But other viewers may find it convenient to watch video (especially HDR video) in the dark, so that they can e.g. enjoy a horror movie as more scary, and/or see dark scenes better.

Whilst typical in medieval times, the lighting of one candle may nowadays be a lower limit, be it only because for city dwellers at such levels more light may leak in from outdoors lamps, like city lights anyway. The candela used to be defined as the brightness of a typical candle, so if one puts a surface one meter away from the candle, it will get 1 lx, which still makes objects watchable, although e.g. text on paper not highly easy to read (for reference, 1 lx is also typical of a moonlit scene outdoors). So that level of illumination would be achieved if one were to light a room of 5 meters wide by a number of candles. Even a single 40 W incandescent light bulb already creates approximately 40× more light than the candle, so for most viewers one or a couple of such lamps will be a more typical surround light level. So one may expect something like k*10 lx for watching with not too much (atmospheric) light. However, videos may have been defined so that they are also reasonably watchable during the daytime, in which case the illumination may be n*50 lx (e.g. if a 200 W set of light bulbs is placed at about 2 meters away one gets approximately 3000/50 lux; if one were to watch the display for recipes in the kitchen, one might want a light level of approximately 3× higher, to safely perform the cooking activities like cutting).

For mobile/outdoors situations the light level may be higher, e.g. when sitting near the window of a train, or under a tree in the shadow, etc. The light level may then be e.g. 1000 lx. We will assume, without wanting to be limiting, that a good value of GenVwLx for television program video viewing will be 100 lux.

Assume that the light sensor measures Lx_sur=550 lux. Then the relative surround light level can be calculated as:

$$SurMult = GenVwLx/Lx\_sur = 100/550 = 0.18. \qquad [\text{Eq. 11}]$$

The adjusted maximum luminance value PL_V_CO for a 1000 nit MDR display will then be:

$$PL\_V\_CO = PL\_D * SurMult = 1000 * 0.18 = 180 \; nit \qquad [\text{Eq. 12}]$$

In embodiments this can be further controlled by the user, in his he thinks the automatic contrast correction is too strong or vice versa too weak (of course automatic setting may be preferred in some systems and/or situations to not bother the viewer too much).

In this case the display adaptation will use for—i.e. instead of—the adjusted maximum luminance value PL_V_CO in the display adaptation process the user-adjusted maximum luminance value (PL_V_CO_U), which may typically be defined by:

$$PL\_V\_CO\_U = PL\_V\_CO - UCBval \qquad [\text{Eq. 13}]$$

User control value UCBVal may be controlled by any suitably scaled user-input, e.g. a slider setting (UCBSliVal, e.g. falling symmetrically around zero correction, or starting at zero correction, etc.), scaled in such a manner that when the slider is at maximum the user will not ridiculously change the contrast, so that e.g. all dark image regions look almost like bright HDR whites.

For that the apparatus (e.g. display) manufacturer can pre-design a suitable strength value (EXCS), and then the equation may be:

$$UCBVal = PL\_D * UCBSliVal * EXCS \qquad [\text{Eq. 14}]$$

E.g. if one wants 100% to correspond to 10% additional max. luminance-based contrast change, one gets:
PL_D*1*EXCS=0.1*PL_D, ergo EXCS=0.1 etc. (a value of 0.75 was found to be good in a particular embodiment).

Figure 9:
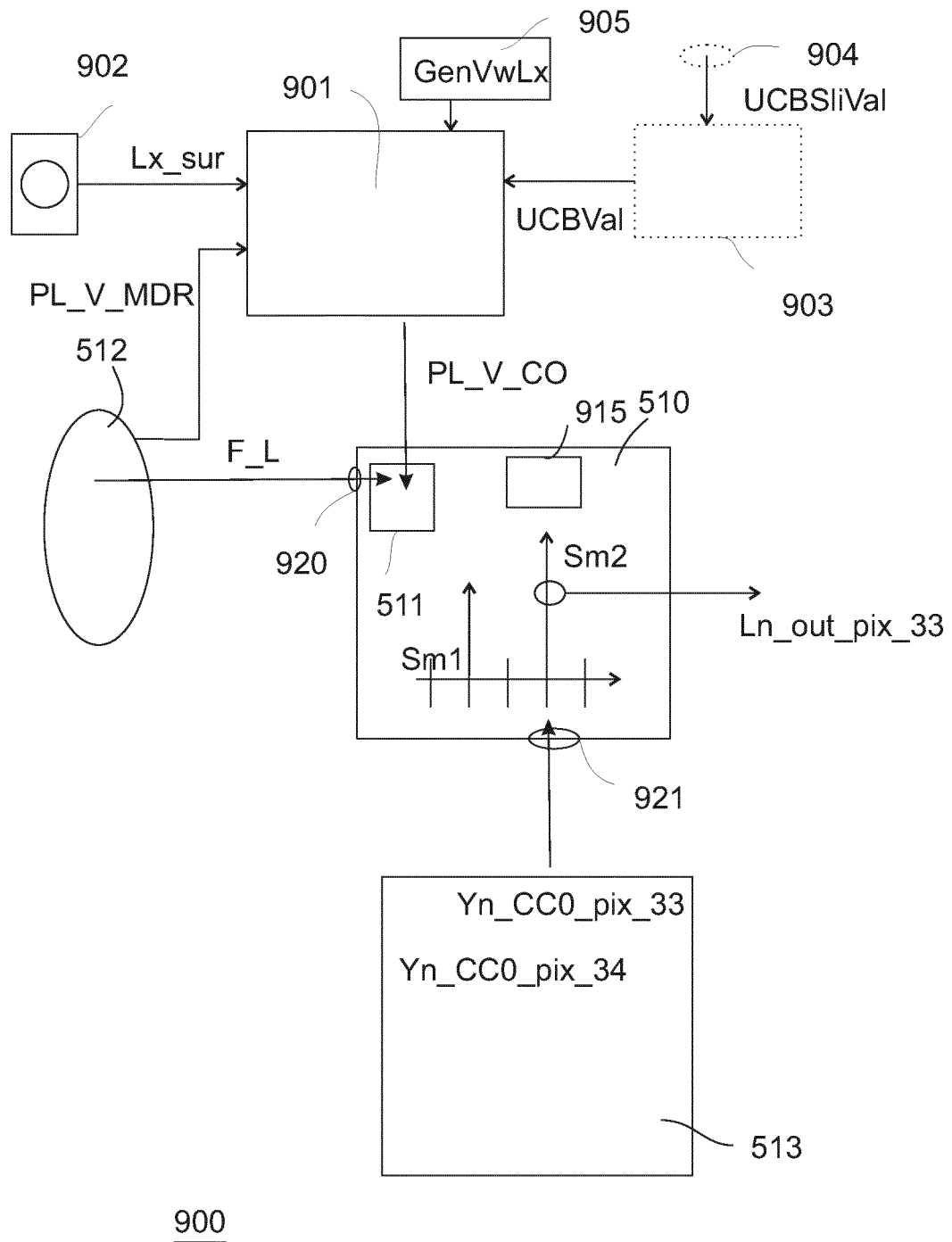
FIG. 9 elucidates a manner to optimize the contrast of an image, in particular to compensate for various viewing environment light levels or situations, specifically when designing it around existing display adaptation approaches.

FIG. 9 shows possible embodiment elements in a typical apparatus construction.

The apparatus for processing an input image 900 to obtain an output image (a.k.a. the surround-optimizing display optimization apparatus) has a data input (920) for receiving a reference luminance mapping function (F_L) which is metadata associated with the input image. This function again specifies a relationship between luminances of a first reference image and luminances of a second reference image. These two images may again in several embodiments have been graded by the creator of the video, and co-communicated with the video itself as metadata, e.g. over satellite television broadcast. However, a suitable re-grading luminance mapping function F_L may also be determined by a re-grading automaton in the receiving side apparatus, e.g. a television display. The function may vary over time (F_L(t)).

The input image typically functions as the first reference grading, from which display- and environment-optimized images are determined, and it may typically be a HDR image. The maximum luminance of the display-adapted output image (i.e. output maximum luminance PL_V_MDR) typically falls between the maximum luminances of the two reference images.

The apparatus typically comprises, or equivalently is connected to, an illuminance meter (902) arranged to determine an amount of light of a surrounding environment falling on a display, namely the display which is being supplied with optimized images to watch. This amount of illumination from the viewing environment is represented as a surround illumination value (Lx_sur), which can be in units of lux or represented as an equivalent luminance in nit, as it will be used in a division.

The display adaptation circuit 510 is arranged to determine an adapted luminance mapping function (FL_DA) which is based on the reference luminance mapping function (F_L). It also actually does the pixel color processing so it comprises a luminance mapper (915) similar to color transformer 202 described above. There may also be color processing involved. Configuration processor 511 may do the actual determination of the (surround-optimized) luminance mapping function to use, prior to running the per-pixel processing of a current image. Such input image (513) is received via image input (921), e.g. an IC pin, which may itself be connected to some image supply into the apparatus, e.g. an HDMI cable, etc.

The adapted luminance mapping function (FL_DA) is determined based on the reference luminance mapping function F_L and some value of a maximum luminance, as per the above-described display adaptation algorithm variants, but now the maximum luminance is not the typical maximum luminance of a connected display (PL_D), but a specifically adjusted maximum luminance value (PL_V_CO), adjusted to the amount of light in the viewing environment (and potentially further user correction). The luminance mapper applies the adapted luminance mapping function (FL_DA) to the input pixel luminances, to obtain output luminances, To calculate the adjusted maximum luminance value (PL_V_CO), the apparatus comprises a maximum luminance determination unit (901), which is connected to the display adaptation circuit 510 to supply this adjusted maximum luminance value (PL_V_CO) to the display adaptation circuit (510).

This maximum luminance determination unit (901) obtains a reference illumination value (GenVwLx) from a memory 905 (e.g. this value may be pre-stored by the apparatus manufacturer, or be selectable based on which type of image comes in, or loaded with typical intended surround metadata co-communicated with the image, etc.). It also obtains a maximum luminance (PL_V_MDR), which may be e.g. a fixed value stored in a display, or configurable in an apparatus (e.g. a settopbox or other image pre-processing apparatus) which is capable of supplying images to various displays.

The adjusted maximum luminance value (PL_V_CO) is determined by the maximum luminance determination unit (901) as follows:
first a relative surround light level (SurMult) is determined by dividing the reference illumination value (GenVwLx) by the surround illumination value (Lx_sur);
then the adjusted maximum luminance value (PL_V_CO) is determined as the result of multiplying the output maximum luminance (PL_V_MDR) by the relative surround light level (SurMult).

In some embodiments a user (viewer) may further control the automatic surround-optimization of the display adaptation according to his taste.

Thereto a user interface control component 904 is coupled, e.g. a slider, which allows the user to set higher or lower values, e.g. a slider setting UCBSliVal. This value is input to a user value circuit 903, which communicates to the maximum luminance determination unit 901 the user control value UCBVal, as calculated by Eq. 14 (PL_D=PL_V_MDR).

Figure 10:
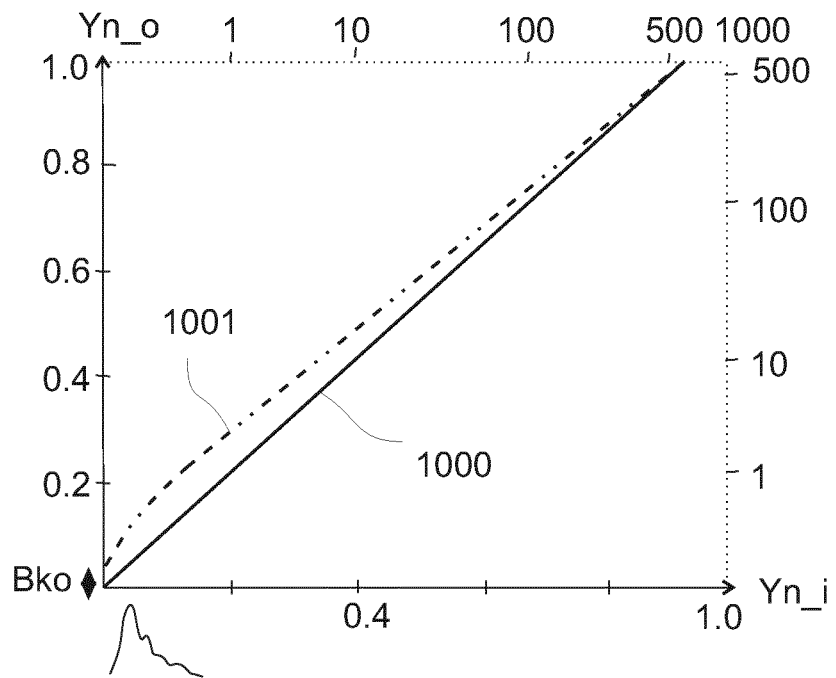
FIG. 10 shows a practical example on some image luminances with a particular reference mapping function F_L (for easy understanding elected to be a simple linear curve), of what happens when applying the viewing environment illumination adaptive techniques (explained with FIG. 6)

FIG. 10 shows an example of processing, which a specific luminance mapping function F_L. We assume the reference mapping function (1000) is a simple luminance identity transform, i.e. which clips above the maximum display capability of 600 nit. The luminance mapping is here represented on a plot of equivalent psychovisually uniformized lumas, as calculable according to Eqs. 3. The input normalized luma Yn_i corresponds to the HDR input luminance, which we assume to be a 1000 nit maximum luminance HDR image (i.e. the RHO for a PL_V_HDR=1000 nit is used in the equation). For the output normalized lumas Yn_o we assumed an exemplary display of 600 nit, ergo, they are re-converted to luminances by using a RHO value corresponding to 600 nit. For convenience at the right and top are the corresponding luminances to the luma positions. This elected F_L reference mapping function 1000 hence performs an equi-compression in the visually uniformized luma domain. The (surround) adapted luminance mapping function FL_DA, is shown as curve 1001. On the one hand we see an offset Bko, which depends inter alia on the leak black of the display. On the other hand we see a curvature which mostly boosts the darkest blacks, which is due to the remnant effect of processing in the non-linear psychovisually uniformized luma domain.

Figure 11:
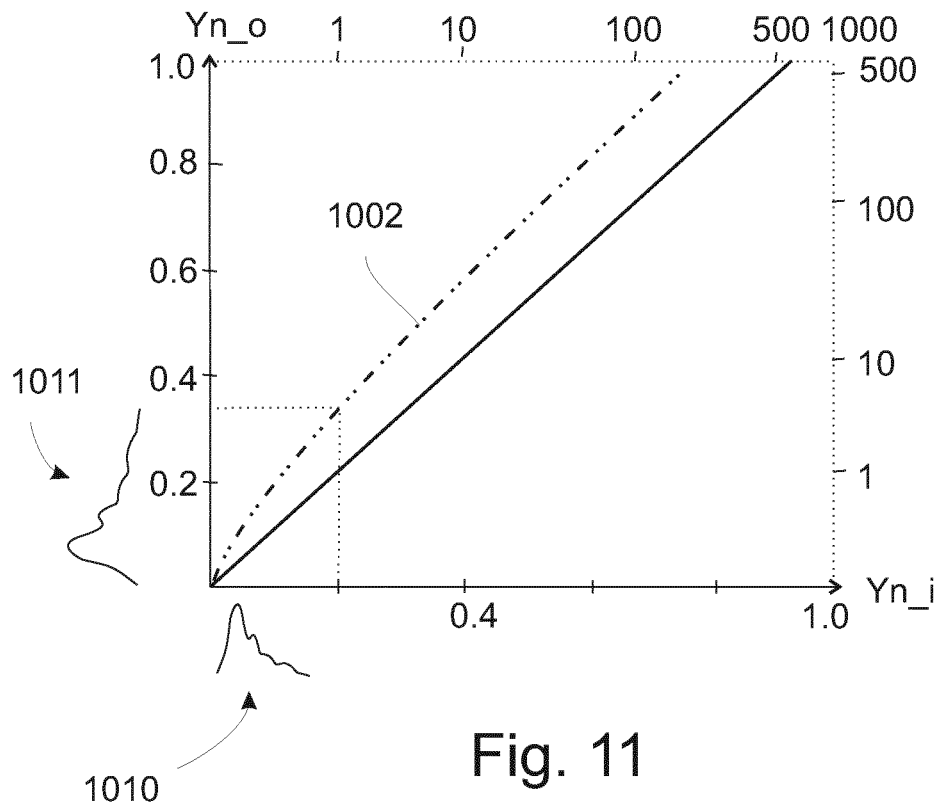
FIG. 11 shows a practical example of what happens when one applies the contrast improvement techniques explained with FIG. 9 (without viewing environment illumination, but those two processings can also be combined, which would result in an additional offset for the blackest black).

FIG. 11 shows an example of the contrast boosting embodiments (with the offset of the surround illumination set to zero, but as said both processings could be combined). If one changes the luminance mapping in the relative normalized psychovisually uniformized luma domain, this relative domain could start at value zero. The master HDR image may start at some black value, but for the lesser output one may use a black offset to map this to zero (or to the minimum black of the display; note: displays may have various behavior of darker input, e.g. clipping, so one can put the true zero there).

If one uses a modified display adaptation, black zero input will typically map to black zero, whatever the value of the adjusted maximum luminance value (PL_V_CO). In general, the zero point of the output lumas may start at the virtual black level mL_VD (ideally), or the minimum black of the actual end-user display mB_fD, but in any case there is differential brightening of these darkest colors, leading to a better visible contrast for dark pictures like a night scene (the input luminance histogram 1010 is stretched on the normalized luma axis of the output lumas as output luminance histogram 1011, which will give sufficient image contrast despite of the lower PL_V_MDR=PL_D=600 nit. When the two methods are combined, all processing to obtain the appropriate black level offset Bko is best shifted to the processing explained with FIG. 6 et al (i.e. one could do the adjusted contrast processing with an image starting at zero, and a function starting at zero). In practice one may always simply define an F_L curve that starts at zero (maps zero HDR luminance or luma to zero output luminance or luma), irrespective of whether such value actually occur in the input image, as the display adaptation luminance (luma) mapping will simply happen anyway.

Note that another embodiment may not have the illuminance meter present, but only the user control (904, 903). This embodiment will then vary the contrast only based on user input, as if there was no automatic surround correction of PL_V_CO of Eq. 13. The maximum luminance of the end-user display PL_D will then function as the neutral point, as per Eq. 15:

$$PL\_V\_CO\_U = PL\_D - UCBval \qquad [\text{Eq. 15}]$$

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A method comprising:
    obtaining a starting luma, wherein the starting luma is related to an input luminance via an opto-electronic transfer function;
    obtaining a target minimum luminance,
        wherein the target minimum luminance is the minimum luminance of a targeted display,
        wherein the targeted display corresponds to an end-user display;
    obtaining an illuminated end-user minimum luminance,
        wherein the illuminated end-user minimum luminance is the minimum luminance of the end-user display,
        wherein the illuminated end-user minimum luminance is dependent on an amount of illumination in a viewing room;
    calculating a difference by subtracting the illuminated end-user minimum luminance from the target minimum luminance;
    converting the difference to a luma difference by applying the opto-electronic transfer function to the difference;
    applying a linear function to the starting luma so as to obtain a mapped luma, wherein the linear function comprises the luma difference multiplied by −1.0 added to the starting luma multiplied by constant, wherein the constant is the luma difference plus 1.0;
    applying the inverse of the opto-electronic transfer function to the mapped luma so as to obtain a normalized intermediate luminance;
    subtracting a native end-user minimum luminance divided by an output maximum luminance from the intermediate luminances,
        wherein the output maximum luminance is the maximum luminance of an output image;
    scaling the subtraction by 1.0 minus the result of dividing the native end-user minimum luminance by the maximum luminance of the output image so as to obtain a final normalized luminance;
    multiplying the final normalized luminance by the maximum luminance of the output image so as to obtain an output luminance; and
    providing the output luminance in a color representation of the output image.

2. The method as claimed in claim 1, further comprising determining the maximum luminance of the output image as either a maximum luminance of the end-user display or a maximum luminance of the input image.

3. The method as claimed in claim 1, further comprising:
    calculating a display-optimized luminance mapping function based on a reference luminance mapping function and a maximum luminance of the end-user display; and
    using the display-optimized luminance mapping function to map an input luma to the starting luma,
    wherein the display-optimized luminance mapping function has a display-optimized slope for the darkest input lumas,
    wherein the reference luminance mapping function has a reference slope for the darkest lumas, wherein the display-optimized slope is smaller than the reference slope, wherein the reference luminance mapping function specifies a relationship between luminances of a first reference image and luminances of a second reference image, wherein first reference image has a first reference maximum luminance, wherein second reference image has a second reference maximum luminance, wherein the maximum luminance of the end-user display falls in between the first reference maximum luminance and a second reference maximum luminance.

4. The method as claimed in claim 3, wherein the second reference image is a standard dynamic range image, wherein the second reference maximum luminance is 100 nit.

5. The method as claimed in claim 3, further comprising, calculating a locus of points so as to form the display-optimized luminance mapping function, wherein each point on the locus is a point on a metric, wherein the metric has a first endpoint and a second endpoint, wherein the first endpoint is on the reference luminance mapping function, wherein the second endpoint is on a diagonal, wherein the locus of points depends on the output maximum luminance.

6. The method as claimed in claim 1, wherein the opto-electronic transfer function is a psycho-visually uniform opto-electronic transfer function.

7. A computer program stored on a non-transitory medium, wherein the computer program when executed on a processor performs the method as claimed in claim 1.

8. An apparatus comprising:

an input circuit, wherein the input circuit is arranged obtain a starting luma, a target minimum luminance a native end-user minimum luminance and an illuminated end-user minimum luminance, wherein the target minimum luminance is a minimum luminance of a targeted display, wherein the targeted display corresponds to an end-user display, wherein the illuminated end-user minimum luminance is a minimum luminance of the end-user display, wherein the illuminated end-user minimum luminance is dependent on an amount of illumination in a viewing room;

a luminance difference calculator circuit, wherein the luminance difference calculator circuit is arranged to calculate a difference by subtracting the end-user minimum luminance from the target minimum luminance;

a first opto-electronic conversion circuit, wherein the first opto-electronic conversion circuit is arranged to convert the difference to a luma difference by applying an opto-electronic transfer function to the difference;

a linear scaling circuit, wherein the linear scaling circuit is arranged to apply a linear function to the starting luma so as to obtain a mapped luma, wherein the linear function comprises the luma difference multiplied by −1.0 added to the starting luma multiplied by constant, wherein the constant is the luma difference plus 1.0;

a second opto-electronic conversion circuit, wherein the second opto-electronic conversion circuit is arranged to convert the mapped luma to normalized intermediate luminances by applying the inverse of the opto-electronic transfer function to the mapped luma so as to obtain a normalized intermediate luminance;

a final adjustment circuit, wherein the final adjustment circuit is arranged to subtract the native end-user minimum luminance divided by an output maximum luminance from the intermediate luminances so as to obtain a first result, wherein the output maximum luminance is the maximum luminance of an output image;

wherein the final adjustment circuit is arranged to scale the first result by 1.0 minus the second result so as to obtain a final normalized luminance, wherein is the second result is the division of the second minimum luminance by the maximum luminance of the output image;

a multiplier circuit, wherein the multiplier circuit is arranged to multiply the final normalized luminance by the maximum luminance of the output image so as to obtain an output luminance; and an output circuit, wherein the output circuit is arranged to provide an output luminance as a color representation of the output image.

9. The apparatus as claimed in claim 8, further comprising a maximum determination circuit, wherein the maximum determination circuit is arranged to determine the maximum luminance of the output image as either a maximum luminance of the end-user display or a maximum luminance of the input image.

10. The apparatus as claimed in claim 8, further comprising:

a display optimization circuit, wherein the display optimization circuit is arranged to calculate a display-optimized luminance mapping function based on a reference luminance mapping function and a maximum luminance of the end-user display; and a luminance mapping circuit wherein the luminance mapping circuit is arranged to apply the display-optimized luminance mapping function to and input luma so as to obtain the starting luma wherein the display-optimized luminance mapping function has a display-optimized slope for the darkest input luminance, wherein of the reference luminance mapping function has a reference slope for the darkest lumas wherein the display-optimized slope is smaller than the reference slope, wherein the reference luminance mapping function specifies a relationship between luminances of a first reference image and luminances of a second reference image, wherein first reference image has a first reference maximum luminance, wherein second reference image has a second reference maximum luminance, wherein the maximum luminance of the end-user display falls in between the first reference maximum luminance and a second reference maximum luminance.

11. The apparatus as claimed in claim 10, wherein the second reference image is a standard dynamic range image, wherein the second reference maximum luminance is 100 nit.

* * * * *